(12) United States Patent
Cartwright

(10) Patent No.: US 8,719,066 B2
(45) Date of Patent: May 6, 2014

(54) SYSTEMS AND METHODS FOR CAPTURING, MANAGING, SHARING, AND VISUALISING ASSET INFORMATION OF AN ORGANIZATION

(75) Inventor: Kathryn Cartwright, Woodinville, WA (US)

(73) Assignee: Edifice Technologies Inc., Woodinville, WA (US)

( * ) Notice: Subject to any disclaimer, the term of this patent is extended or adjusted under 35 U.S.C. 154(b) by 189 days.

(21) Appl. No.: 13/158,915

(22) Filed: Jun. 13, 2011

(65) Prior Publication Data

US 2012/0046978 A1 Feb. 23, 2012

Related U.S. Application Data

(60) Provisional application No. 61/374,513, filed on Aug. 17, 2010.

(51) Int. Cl.
*G06Q 10/00* (2012.01)

(52) U.S. Cl.
USPC .......... 705/7.11; 715/736; 707/705; 705/7.12

(58) Field of Classification Search
CPC .............................. G06Q 10/06; G06F 17/30
USPC ....................................................... 705/7.11
See application file for complete search history.

(56) References Cited

U.S. PATENT DOCUMENTS

| | | | |
|---|---|---|---|
| 7,765,286 B2 | 7/2010 | Mark | |
| 2003/0033296 A1* | 2/2003 | Rothmuller et al. | 707/3 |
| 2003/0137968 A1* | 7/2003 | Lareau et al. | 370/349 |
| 2005/0004825 A1* | 1/2005 | Ehrler et al. | 705/8 |
| 2008/0183483 A1* | 7/2008 | Hart | 705/1 |
| 2008/0281912 A1* | 11/2008 | Dillenberger et al. | 709/204 |
| 2008/0319811 A1* | 12/2008 | Casey | 705/7 |
| 2009/0077055 A1* | 3/2009 | Dillon et al. | 707/5 |
| 2009/0083229 A1* | 3/2009 | Gupta | 707/3 |
| 2009/0212921 A1* | 8/2009 | Wild et al. | 340/10.5 |
| 2009/0216910 A1* | 8/2009 | Duchesneau | 709/250 |
| 2010/0066559 A1* | 3/2010 | Judelson | 340/825.49 |
| 2010/0229113 A1* | 9/2010 | Conner | 715/771 |

OTHER PUBLICATIONS

Theerathon Tharachai, "Multiple Project Resource Scheduling for Construction", The University of Michigan, 2004.*
Claire Urfels, "Information Problem-Solving in Personal, High-Stakes Situations", Graduate School of Syracuse University, May 2000.*
Keith V. Rhodd, "An Exploratory Analysis of Asset Allocation and Performance in Large Commercial Banks", H. Wayne Huizenga School of Business and Enterpreneurship, Nova Southeastern University, 2007.*

* cited by examiner

*Primary Examiner* — Justin M Pats
*Assistant Examiner* — Pan Choy
(74) *Attorney, Agent, or Firm* — Lowe Graham Jones PLLC

(57) ABSTRACT

A system for semantically modeling relationships and dependencies between groups, enclosures, assets, and support entities according to an industry specific manner. An exemplary system includes a user interface device, a relational database and a processor. The processor receives relationship information and receives attributes with associated measurements for the groups, enclosures, assets, and support entities for the corporation from the user interface device. The attributes with associated measurements are formatted according to the specific industry of the corporation. The processor generates a three dimensional (3D) visualization of the groups, enclosures, assets, and support entities and allows a virtual walk-through of the 3D visualization as presented on the display device based on user entered commands from the user input device.

21 Claims, 23 Drawing Sheets

SYSTEMS AND METHODS FOR CAPTURING, MANAGING, SHARING, AND VISUALISING ASSET INFORMATION OF AN ORGANIZATION

PRIORITY CLAIM

This application claims priority to Provisional Patent Application Ser. No. 61/374,513 filed Aug. 17, 2010 and is incorporated herein by reference.

BACKGROUND OF THE INVENTION

Organizations and businesses of all sizes and missions, buy a diverse array of assets. In diversity, these can extend from computer equipment to cattle. Yet the control, movement, resources available and management of these assets, the ongoing costs to maintain them, their purpose and even where they are located is not obvious to many of their owners. In addition many organizations must comply to industry or government standards with respect to the maintenance of such assets which adds significantly to the "need to know" factors surrounding them. The reliance by organizations on these often high value assets is constant and growing. Yet the costs of securing, managing and maintaining assets are prohibitively expensive and often are not visible to key stakeholders. Decision making as a result occurs in a financial and needs analysis vacuum. The challenge is exacerbated by organizations being at breaking point in terms of budgetary, technology, physical space constraints and a shortage of staff. Due to a lack of transparency and visibility every asset has the potential of being used inefficiently, lost all together or even stolen. Today many organizations cannot find assets, tell you the value of them or their use or be able to see changes in their status. Yet countless hours are spent by employees trying to achieve these through basic applications, spreadsheets and in many cases manual processes. In today's world there are real question marks as to what value these assets are really delivering and much time is wasted in this pursuit. While technology has revolutionized almost every area of business life, technological advancement has paradoxically made it difficult to efficiently take control over these challenges.

There are numerous point based solutions that seek to address parts of the problem but there has not until now been a total solution that covers assets in multiple locations that can deliver critical information in the right form to multiple stakeholders. Point based systems are often very expensive, do not embrace the latest technologies and either can't integrate with other important systems organizations have or find doing so extremely difficult. Their mechanisms are often too cumbersome when seeking to manage assets day to day. It is also typically very tedious and manually intensive to maintain up-to-date information in these solutions.

SUMMARY

The present invention provides a system for semantically modeling relationships and dependencies between groups, enclosures, assets, and support entities according to an industry specific manner. An exemplary system includes a user interface device, a relational database, and a processor in data communication with the database and the user interface device. The processor receives relationship and dependency information between groups, enclosures, assets, and support entities for a corporation from the user interface device, receives attributes with associated measurements for the groups, enclosures, assets, and support entities for the corporation from the user interface device. The attributes with associated measurements are formatted according the specific industry of the corporation. The relationship and dependency information and the attributes are stored with associated measurements into the relational database.

In accordance with further aspects of the invention, the system includes a plurality of data transmission devices. Each of the plurality of data transmission devices associated with one of the groups, enclosures, assets, and support entities for the corporation. The plurality of data transmission devices include data of the associated one of the groups, enclosures, assets, and support entities. The system also includes a plurality of data collection devices in signal communication with the processor and the plurality of data transmission devices. The plurality of data collection devices retrieves the data from the plurality of data transmission devices. The data transmission devices and data collection devices include at least one of radio frequency identification (RFID) tags, antenna, readers or concentrators. The processor enters the data received from the data collection devices into the relational database.

In accordance with other aspects of the invention, the processor executes a plurality of data Application Program Interfaces (APIs) that integrate data received from the data collection devices into a comprehensive view of the groups, enclosures, assets, and support entities based on the relational database.

In accordance with still further aspects of the invention, the processor allows a user to create at least one of a graphical or text based report regarding one or more of the groups, enclosures, assets, and support entities. The report includes at least one of absolute values, ranges or comparative values of at least a portion of the attributes. The report filters, sorts, or orders the groups, enclosures, assets, and support entities.

In accordance with yet other aspects of the invention, the processor calculates return on investment based on the asset data. The asset data includes a cost to replace value or a cost of ownership value.

In accordance with still another aspect of the invention, the processor allows a user to define one or more perimeters within which each of the assets are located and to identify the assets within the one or more perimeters.

In accordance with still further aspects of the invention, the database includes a supplier database that stores all assets in an individual group and across all groups.

In accordance with yet another aspect of the invention, the system includes a remote access device that is in data communication with the processor via a public or private data network. The remote access device includes a mobile device, a laptop computer, a tablet computer or a desktop computer.

In accordance with further aspects of the invention, the processor generates a graphical user interface that provides a three dimensional (3D) visualization of the groups, enclosures, assets, and support entities.

In accordance with still further aspects of the invention, the processor allows a user to modify records of the assets, enclosures, groups, and support entities, display values of the attributes, and edit the values of the attributes within the relational database.

In accordance with additional aspects of the invention, the processor allows a user to semantically map the received attributes from disparate sources and the supplier database. The semantically mapped attributes provide context to the received attributes and the attributes' relation to assets, enclosures and groups.

In accordance with yet additional aspects of the invention, the processor allows a user to uniquely identify a location of an asset and physical orientation based on data received using at least one of a Radio Frequency Identification (RFID) system, a Real-time Locating System (RTLS) or Global Positioning System (GPS).

In accordance with still additional aspects of the invention, the processor allows a user to uniquely identify asset identifiers to associate, capture, monitor and timestamp, data with other data pertaining to the asset within the system.

In accordance with other additional aspects of the invention, the processor allows a user to share asset information comprising at least one of a physical asset component data, financial data, contractual data and utilization data and permit the management, display and analysis of asset information on a single user interface.

In accordance with still other aspects of the invention, the processor allows a user to perform at least one of a query, an interrogation, a forecast, a what if scenario and to perform modeling of return on investment based on any change to assets, enclosure and groups.

In accordance with further aspects of the invention, the processor provides trending information and analysis of the user's industry as compared to the user's specific asset deployments.

In accordance with still further aspects of the invention, the 3D visualization includes annotation of groups with at least one of bounds, extents, photographs and related media elements, wherein the 3D visualization comprises at least one of a diagrammatic image or a figurative image. The user interface allows a user to perform at least one of browse, find, create, update or delete information associated with the assets, the enclosures, the groups, and the support entities, and the relationship information. The processor can show via the graphical user interface changes to status of an asset. The processor generates a unique identifier based on a user defined asset search. The unique identifier provides a visual indication of the presence and location of all assets that match the user defined asset search. The processor allows a virtual walkthrough of the 3D visualization as presented on the display device based on user entered commands from the user input device. The processor displays asset attributes based on a user entered selection signal from the user input device during the virtual walkthrough.

BRIEF DESCRIPTION OF THE DRAWINGS

Preferred and alternative examples of the present invention are described in detail below with reference to the following drawings:

FIG. 1-1 is a topological view of the system and its components according to the embodiment of the current invention;

FIG. 2-1 shows a typical example of FIG. 2 as it relates to datacenters providing a logical, semantic view of the relationships between group, enclosure and asset entities within a datacenter environment.

DETAILED DESCRIPTION OF THE PREFERRED EMBODIMENT

In the following description, certain specific details are set forth in order to provide a thorough understanding of various embodiments of the invention. However, one skilled in the art will understand that the invention may be practiced without these details or with various combinations of these details. In other instances, well-known systems and methods associated with, but not necessarily limited to, asset management and methods for operating the same may not be shown or described in detail to avoid unnecessarily obscuring descriptions of the embodiments of the invention.

An embodiment of the invention is deployed on or used in conjunction with, but is not limited to an internet based service and a browser. There are pluralities of components for managing critical assets, integrating all the critical information pertaining to the asset and delivering this information in the needed form for individual stakeholders. Stakeholders have the ability to spatially navigate to an assets location, for example in a building, a field, locally or across the globe, in 2 or 3 Dimensions from their desktop, even when they are hundreds or thousands of miles from the physical asset location. These components may include but are not limited to a desktop browser, mobile device applications, asset information repositories and API's; local or remote information synchronization and maintenance of information pertaining to assets and their interdependencies.

Figure 1:
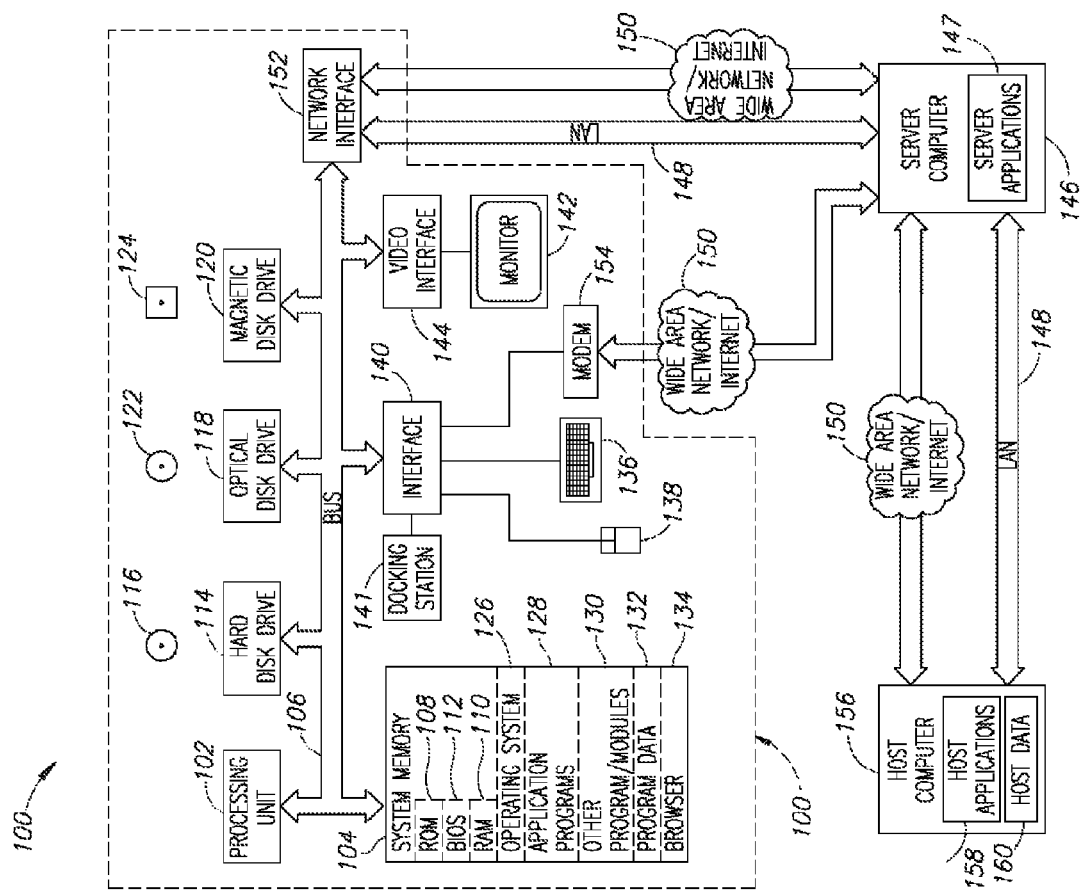
FIG. 1 is a block diagram showing a conventional computer system, various computer peripherals, and various communication means formed in accordance with an embodiment of the invention.
Figure 1:
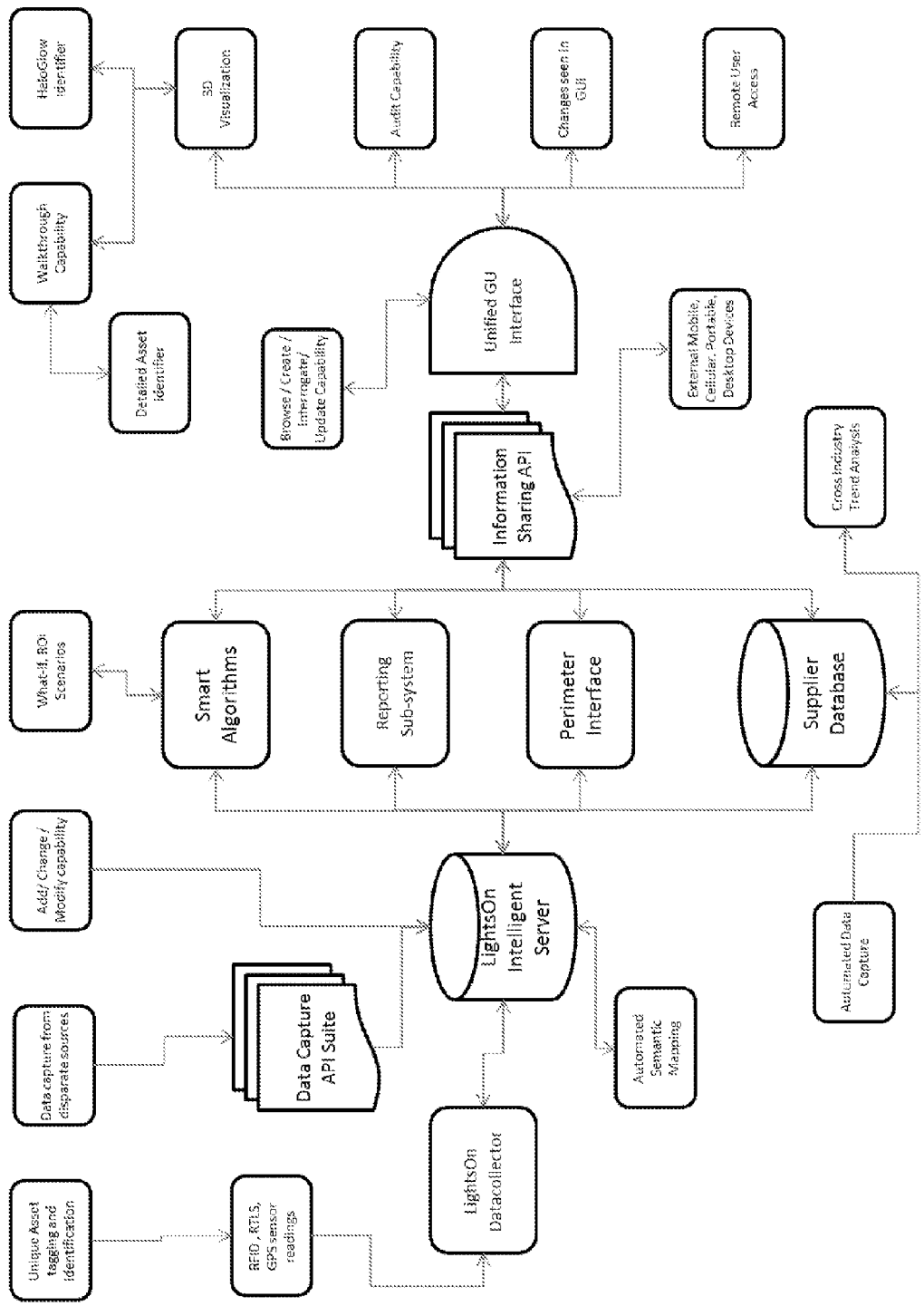

FIG. 1 is a diagram showing a conventional computer, various computer peripherals, and various communication means formed according to an embodiment of the invention. For purposes of brevity and clarity, embodiments of the invention may be described in the general context of computer-executable instructions, such as program application modules, objects, applications, models, or macros being executed by a computer, which may include but are not limited to personal computer systems, hand-held devices, multiprocessor systems, microprocessor-based or programmable consumer electronics, network PCs, mini computers, mainframe computers, and other equivalent computing and processing sub-systems and systems. Aspects of the invention may be practiced in distributed computing environments where tasks or modules are performed by remote processing devices linked through a communications network. Various program modules, data stores, repositories, models, federators, objects, and their equivalents may be located in both local and remote memory storage devices.

By way of example, a conventional personal computer, referred to herein as a computer 100, includes a processing unit 102, a system memory 104, and a system bus 106 that couples various system components including the system memory to the processing unit. The computer 100 will at times be referred to in the singular herein, but this is not intended to limit the application of the invention to a single computer because, in typical embodiments, there will be more than one computer or other device involved. The processing unit 102 may be any logic processing unit, such as one or more central processing units (CPUs), digital signal processors (DSPs), application-specific integrated circuits (ASICs), etc. Unless described otherwise, the construction and operation of the various blocks shown in FIG. 1 are of conventional design. As a result, such blocks need not be described in further detail herein, as they will be understood by those skilled in the relevant art.

The system bus 106 can employ any known bus structures or architectures, including a memory bus with memory controller, a peripheral bus, and a local bus. The system memory 104 includes read-only memory ("ROM") 108 and random access memory ("RAM") 110. A basic input/output system ("BIOS") 112, which can form part of the ROM 108, contains basic routines that help transfer information between elements within the computer 100, such as during start-up.

The computer 100 also includes a hard disk drive 114 for reading from and writing to a hard disk 116, and an optical disk drive 118 and a magnetic disk drive 120 for reading from and writing to removable optical disks 122 and magnetic disks 124, respectively. The optical disk 122 can be a CD-ROM, while the magnetic disk 124 can be a magnetic floppy disk or diskette. The hard disk drive 114, optical disk drive 118, and magnetic disk drive 120 communicate with the processing unit 102 via the bus 106. The hard disk drive 114, optical disk drive 118, and magnetic disk drive 120 may include interfaces or controllers (not shown) coupled between such drives and the bus 106, as is known by those skilled in the relevant art. The drives 114, 118, 120, and their associated computer-readable media, provide nonvolatile storage of computer readable instructions, data structures, program modules, and other data for the computer 100. Although the depicted computer 100 employs hard disk 116, optical disk 122, and magnetic disk 124, those skilled in the relevant art will appreciate that other types of computer-readable media that can store data accessible by a computer may be employed, such as magnetic cassettes, flash memory cards, digital video disks ("DVD"), Bernoulli cartridges, RAMs, ROMs, smart cards, etc.

Program modules can be stored in the system memory 104, such as an operating system 126, one or more application programs 128, other programs or modules 130 and program data 132. The system memory 104 also includes a browser 134 for permitting the computer 100 to access and exchange data with sources such as web sites of the Internet, corporate intranets, or other networks as described below, as well as other server applications on server computers such as those further discussed below. The browser 134 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. Although the depicted embodiment shows the computer 100 as a personal computer, in other embodiments, the computer is some other computer-related device such as a personal data assistant (PDA), a cell phone, or other mobile device.

The operating system 126 may be stored in the system memory 104, as shown, while application programs 128, other programs/modules 130, program data 132, and browser 134 can be stored on the hard disk 116 of the hard disk drive 114, the optical disk 122 of the optical disk drive 118, and/or the magnetic disk 124 of the magnetic disk drive 120. A user can enter commands and information into the computer 100 through input devices such as a keyboard 136 and a pointing device such as a mouse 138. Other input devices can include a microphone, joystick, game pad, scanner, etc. These and other input devices are connected to the processing unit 102 through an interface 140 such as a serial port interface that couples to the bus 106, although other interfaces such as a parallel port, a game port, a wireless interface, or a universal serial bus ("USB") can be used. A monitor 142 or other display device is coupled to the bus 106 via a video interface 144, such as a video adapter. The computer 100 can include other output devices, such as speakers, printers, etc.

The computer 100 can operate in a networked environment using logical connections to one or more remote computers, such as a server computer 146. The server computer 146 can be another personal computer, a server, another type of computer, or a collection of more than one computer communicatively linked together and typically includes many or all the elements described above for the computer 100. The server computer 146 is logically connected to one or more of the computers 100 under any known method of permitting computers to communicate, such as through a local area network ("LAN") 148, or a wide area network ("WAN") or the Internet 150. Such networking environments are well known in wired and wireless enterprise-wide computer networks, intranets, extranets, and the Internet. Other embodiments include other types of communication networks, including telecommunications networks, cellular networks, paging networks, and other mobile networks. The server computer 146 may be configured to run server applications 147.

When used in a LAN networking environment, the computer 100 is connected to the LAN 148 through an adapter or network interface 152 (communicatively linked to the bus 106). When used in a WAN networking environment, the computer 100 often includes a modem 154 or other device, such as the network interface 152, for establishing communications over the WAN/Internet 150. The modem 154 may be communicatively linked between the interface 140 and the WAN/Internet 150. In a networked environment, program modules, application programs, or data, or portions thereof, can be stored in the server computer 146. In the depicted embodiment, the computer 100 is communicatively linked to the server computer 146 through the LAN 148 or the WAN/Internet 150 with TCP/IP middle layer network protocols; however, other similar network protocol layers are used in other embodiments. Those skilled in the relevant art will readily recognize that the network connections are only some examples of establishing communication links between computers, and other links may be used, including wireless links.

The server computer 146 is further communicatively linked to a legacy host data system 156 typically through the LAN 148 or the WAN/Internet 150 or other networking configuration such as a direct asynchronous connection (not shown). Other embodiments may support the server computer 146 and the legacy host data system 156 on one computer system by operating all server applications and legacy host data system on the one computer system. The legacy host data system 156 may take the form of a mainframe computer. The legacy host data system 156 is configured to run host applications 158, such as in system memory, and store host data 160 such as business related data.

A 3-Dimensional (3D) Visualization component provides a real-time 3D visualization, navigation and reporting of all assets both physically and virtually. The 3D Visualization component automates the monitoring, analysis and interrogation of assets to optimize every functional aspect. The 3D Visualization component is accessed though a powerful web graphical user interface (GUI) dashboard.

Using the 3D Visualization component a user can select an asset or assets that are of interest. The Asset Halo Glow Identifier maps and highlights all assets that match the specific asset search and allows the visual differentiation between selected and non-selected assets. Non-exhaustive lookup examples would include assets that are of a specific age, livestock of a particular breed, assets that are moving versus not moving and assets that need servicing, Once the visualization has highlighted where those assets are the user can virtually walk up to them. Once there, the user can click or mouse-over on the asset or series of assets and be shown detailed attribute information about the Asset and all its credentials based on the particular stakeholder view. This for example could be financial information about the Asset, when it was purchased, weight, consumption, and how much is it costing. As another example one may want to know details about the movement of an asset; where it has been over the past month and where it is now. Whatever view the stakeholder wishes, based on their role, can be satisfied by the 3D Visualization component.

A semantic database is a hub that centralizes and models all information and brings assets into a unified intelligent infrastructure. The database is a hosted database accessed through a powerful web GUI dashboard that allows customers to manage, analyze, report on and visualize assets, assets in buildings and/or outdoors and all the information pertaining to them. The database provides the business intelligence and knowledge based on which asset management, location management, capacity management and planning takes place. All existing asset information, their utilization, location, maintenance schedules and financial data is captured by the database. Each Organization, Enclosure, and Asset, and support entities having attributes with associated measures specific to their industry. By way of example:

a. A non-exhaustive example for an Asset modeling a computer would be weight, power, cooling, height, width, length b. A non-exhaustive example for an Asset modeling livestock would be weight, birth date, inoculations, breed and sex The database allows customers to intuitively manage resource usage, forecast and introduce new capacity simply and quickly. Stakeholders from across an organization including asset owners, facility managers, administrators and finance can access the critical information they need from the database eliminating the cost and expense of having multiple sources and the errors that inevitably result.

The system integrates and semantically aligns information directly accessed from source providers of assets capturing all key specification data and automatically populating this information as entities within the database for existing and newly acquired assets. It further enables the same from any other valid source of information that allows a complete picture of an asset and all its attributes. Such information is downloaded and stored in the database. In doing so, additional entities can be added to model behaviors and relationships specific to each Industry.

a. In the IT industry for example, a Project entity can be created which tracks such things as project budget and name, and have relationships to the Organizations and Assets involved.

b. In the livestock industry, a Contract entity could be added, which then has relationships to the animal involved in a given sales contract, specifies the price per head, and has relations to the Organizations representing the buyer and seller of the cattle.

The system allows users to undertake detailed analysis of assets based on all the multi-dimensional information provided. It provides comprehensive "what if" and "time machine" capabilities that allows users to model scenarios or see the status of an asset in a snapshot moment in time. One can further for example draw comparisons of existing assets with alternatives, challenge methods for asset optimization, use and deployment, and identify any costs to replace or extend their use.

The system captures and consolidates asset data pertaining to all customer using the system within an industry. The system then provides back to each customer consolidated trending information pertaining to the assets they collectively have. In doing so the system delivers industry insights to aid the decision making process and learnings from actual dynamics across an industry. Then by way of a single example a customers can review trends in swapping or replacing assets and run replacement scenarios on existing asset with new potential alternatives.

The system allows the definition and mapping of perimeter extents of an Enclosure through the Perimeter Interface Module. A non-exhaustive example of perimeter types by industry include a datacenter room, a barn, a freight container or a casino room. Assets are the able to be located and identified within the perimeter. The Perimeter Interface Module works with passive and active assets. The Perimeter Interface Module has been designed to be generic and does not require modification for different vertical markets such as Datacenter, Retail, Security, Livestock and Gaming, since it is independent of layered applications and databases that manages and collects asset information for statics output.

The system allows the unique identification of an Asset. Unique identifiers in a datacenter example would be an asset's serial number combined with the RFID Tag number and signal associated with that asset. The combination of these two attributes enables the system to associate, capture, monitor and timestamp data from other data sources that pertain to the Asset within the system and ensures its accuracy and integrity.

Through the use of advanced, low cost local Radio Frequency Identification (RFID), Real-time Locating Systems (RTLS) or Global Positioning System (GPS) tags and sensors, the present invention provides a real-time synchronized view between the system and the "real time location of assets geospatially". Tags and sensors send information to "in-theater" readers, scanners and concentrators, that integrate to the Datacollector and sent via the network whether intranet or internet to the system. The system then monitors asset provisioning, movement and use thereby reducing and in some cases eliminating the need for human intervention in physical "in-theater" monitoring. It provides the ultimate in asset security and theft deterrence identifying an asset's status, immediately flagging all movements to key stakeholders.

A comprehensive asset and event management Application Program Interface (API) preferably includes a set of API's to support integration of information from disparate sources pertaining to each individual asset or group of assets. These API's support specifying products and the on-boarding of new assets, events and updates, detailed analysis whether historic, current or futuristic and establishing relationships between people and the assets in question and/or sharing information with colleagues or important 3rd parties. The ability to share information with other users/stakeholders delivers to each broad access to important data that would otherwise be unavailable or require users to manually intervene with disparate sources/applications to access the data. The system provides the automation and delivery of an information sharing paradigm through API's into unified Graphical User Interface. API's also provide the ability to obtain aggregate, statistical and individual reporting data, including, but not limited to the type, number, cost, location and usability information about assets.

Using RFID, RTLS or GPS readers, scanners and concentrators, an audit component identifies moves, additions or changes to an asset. Audit sensors and reader devices, integrated to the Datacollector and sent via the network whether an intranet or the internet to the system which receives downloaded information concerning the assets at a particular locations. The audit component then verifies that all of the assets have an active tag. If not, data entry is performed on new assets. The audit component then performs a tag scan and if an asset is missing, the audit component verifies and records the missing asset; if an asset is new (new, known tag), the audit component performs data entry.

The present invention has the ability to analyze and make decisions based on the integration of facts concerning every aspect of an asset and use of tools provided to support and validate such decisions.

All assets have logistical implications, cost to run or maintain, cost to replace, and benefits/implications of replacement. In particular it is important to know and plan what alternatives exist and the timing options for replacement. An embodiment of the system provides capabilities for assessing and planning these types of scenarios and provides the mechanisms to properly account for them.

Information about assets is made available through the system infrastructure, optionally using a GUI. This information may be available to users via standard reports or the "user defined" report building capability for the purposes of managing the effectiveness of assets including their cost to maintain, usability, security, viability end of life and replacement strategy. The system further provides a user defined alert capability that lets key users know when certain important events take place.

The systems provides the Smart Algorithms module that allows users to seamlessly automate the analysis, data mining, calculation and visualization of return on investment by comparing re-fresh scenarios between current Assets information including but not limited to cost to replace, cost of ownership, consumption, space allocation and performance with future alternatives.

FIG. 1-1 provides a topological map of the systems and its current components. It shows the inter-relationships between the components and embodiments of the invention.

Figure 2:
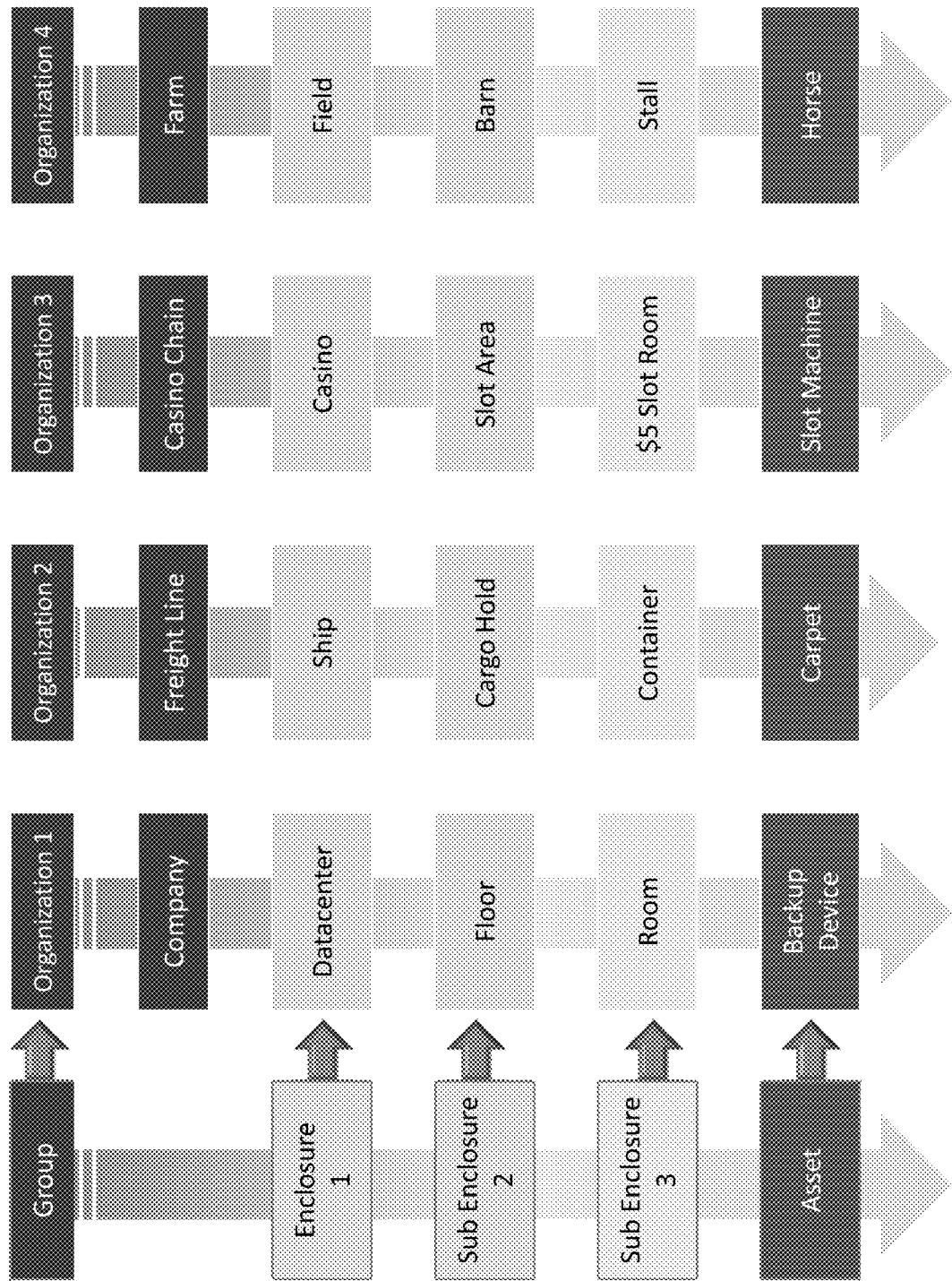
FIG. 2 is a logical, semantic view of the relationships between group, enclosure and asset entities and examples of such interrelations used by the system of FIG. 1 for capturing and managing assets in disparate locations, indoors, outdoors, locally or geographically dispersed according to an embodiment of the invention.
Figures 1, 2:
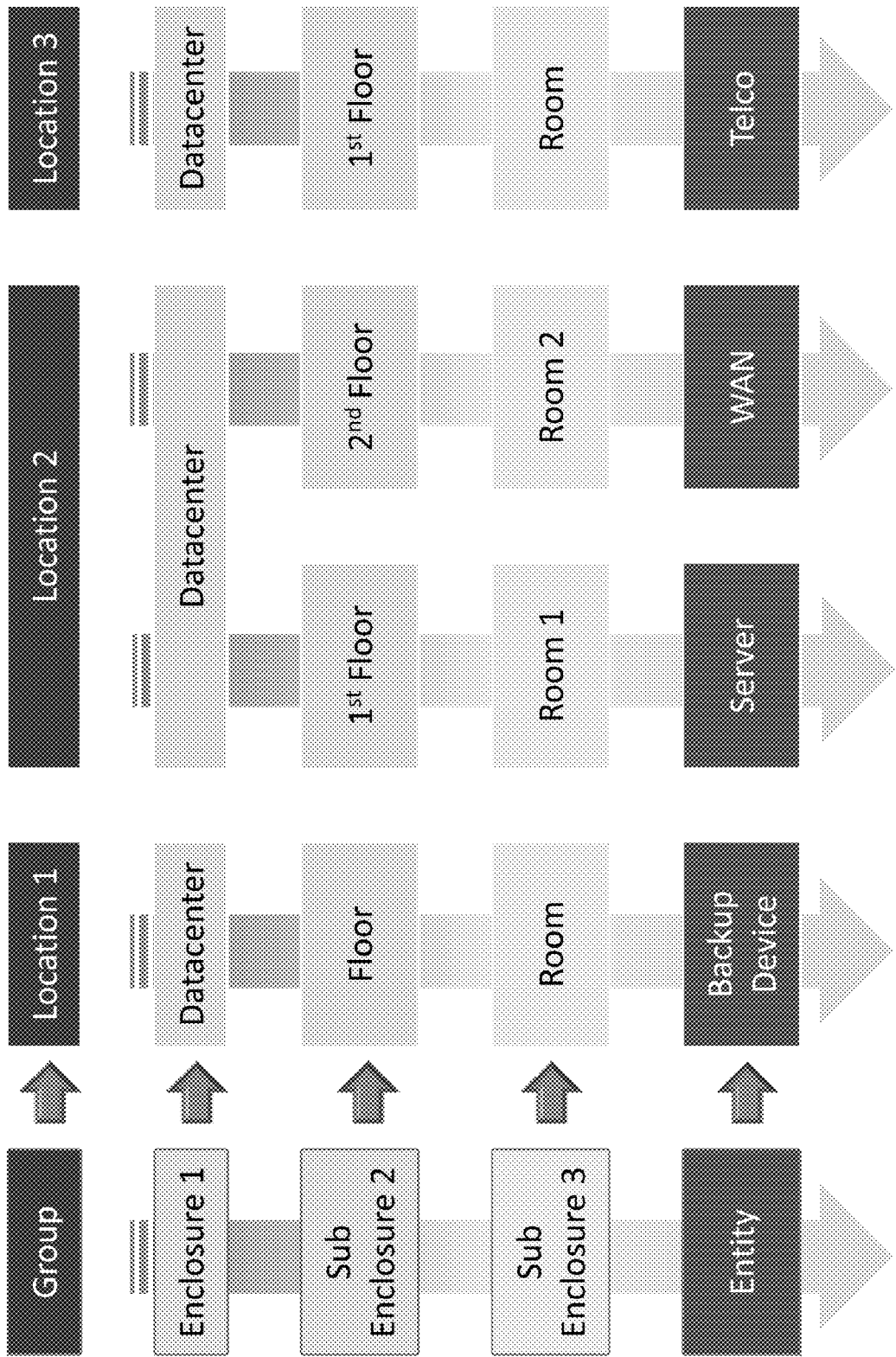

FIG. 2 describes an embodiment of the invention in the underlying Omnibus technology architecture namely, a system capable of defining arbitrarily nestable and classifiable entities, which represent purely semantic relationships. There are three primary entity types:

1. Groups: Logical groupings of other groups/enclosures i.e. Division, Company, etc such as "Organization" e.g. a company, a farm, a freight liner or a casino 2. Enclosures: A Group with 'extent', and other attributes. A system capable of defining arbitrarily nestable and classifiable Enclosures, which include both a semantic label, and an extent, a position, and a physical orientation in space relative to its parent or some global coordinate system. Represent organizational units that have a physical presence of some kind These can be classified arbitrarily, "Server Room", "Datacenter", "Container". They can be associated with users, projects or contracts. They can have other Enclosures or Assets as children. By way of example Enclosures:

Can be used to model a Datacenter, with an Enclosure root node labeled as "Building", and given a extent modeling the building volume, and its position in latitude and longitude. This has sub-enclosures such as "Floor" and "Room", each with its own size, and position relative to the parent using the Perimeter Mapping Module.

Can be used to model any enclosures within any organization. In the case of a farm, enclosure examples include Field with sub-enclosure Barn with sub-enclosure Stall using the Perimeter Mapping Module.

Can then be associated with any applicable Group that own(s) them.

3. Assets: Physical items with physical presence, physical traits and measurable attributes (Weight, Temperature, Size, Age, Value) and can be classified arbitrarily, such as "Computer Server", "Horse", "Painting". All Assets can contain sub-asset classes.

FIG. 2-1 describes an embodiment of the invention as it specifically relates to datacenters within the underlying Omnibus technology architecture where the system capable of defining arbitrarily nestable and classifiable entities such as locations, buildings, floors and machine rooms.

Furthermore, for each area of applicability, Application Specific Entities can be added with their own attributes, which are then associated with an enclosure that contains them.

Computer equipment as Asset entities can be associated with the Enclosure modeling a datacenter room Enclosure on a particular floor Enclosure.

Horses as entities can be associated with the stall enclosure they are in and the higher level barn Enclosure.

Figure 3:
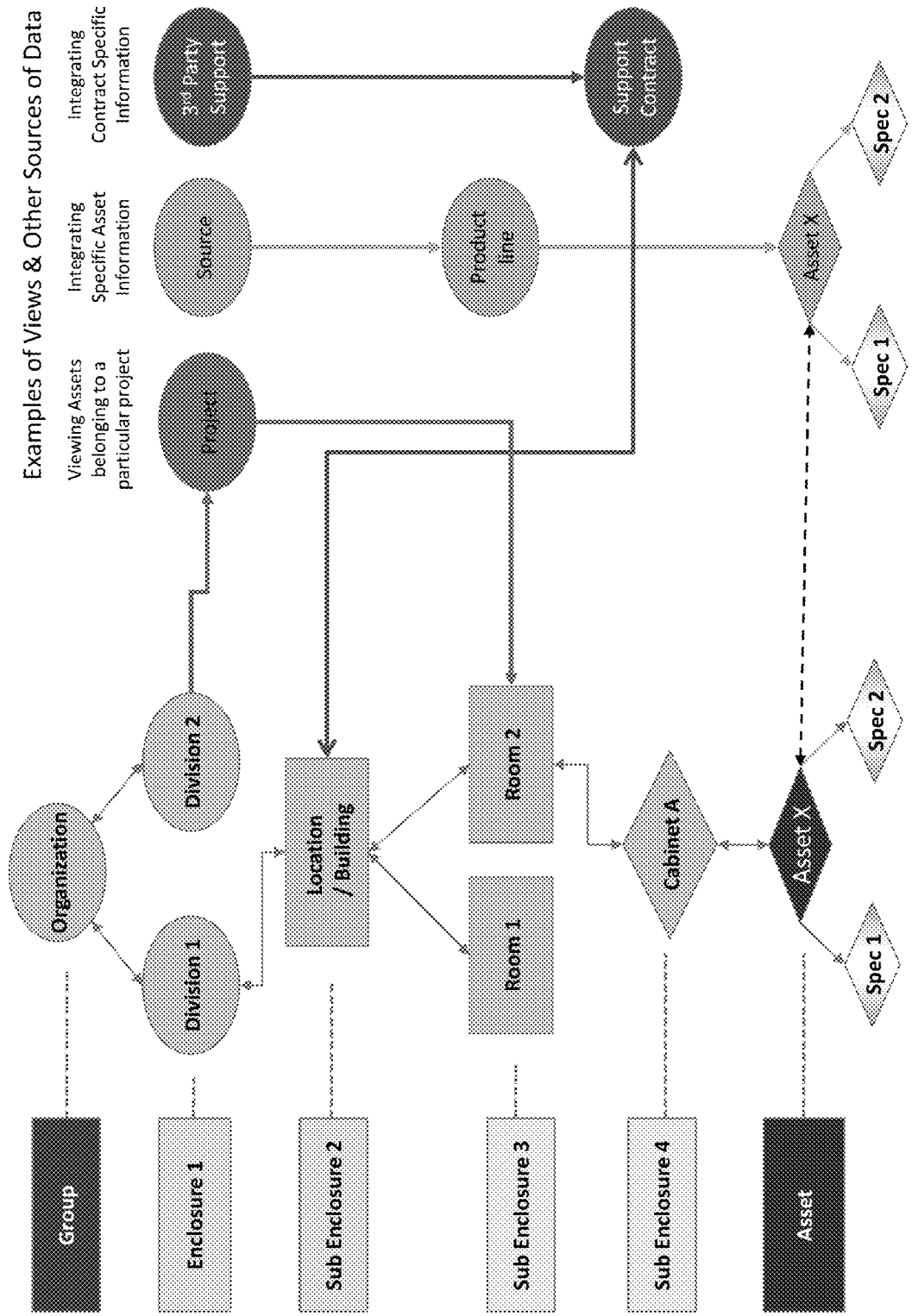
FIG. 3 is a further schematic sample view of the system for capturing and managing datacenter assets in disparate locations and how other information from other data sources are semantically mapped to entities according to an embodiment of the invention.

FIG. 3 illustrates an embodiment of the invention that allows other objects, groups and their separate trees to be further added to model other special purpose objects, semantic groupings and their interrelationships to existing objects to model and manage the inter-relationships between Groups. These may be for example in a datacenter scenario:

A "Contract" object that can be used to denote the support relationship between a separate Organization providing maintenance services.

Groups and Assets/Enclosures encapsulating a cross-department or multi-company project.

A "Source" that is the originating organization of the asset facilitating the capture of specific information pertaining to an Asset.

In this embodiment, the Persistence/Data Tier, Business Services and Web Services tiers are implemented using the Java EE 6 platform which enables broad industry integration and inter-operability.

Figure 4:
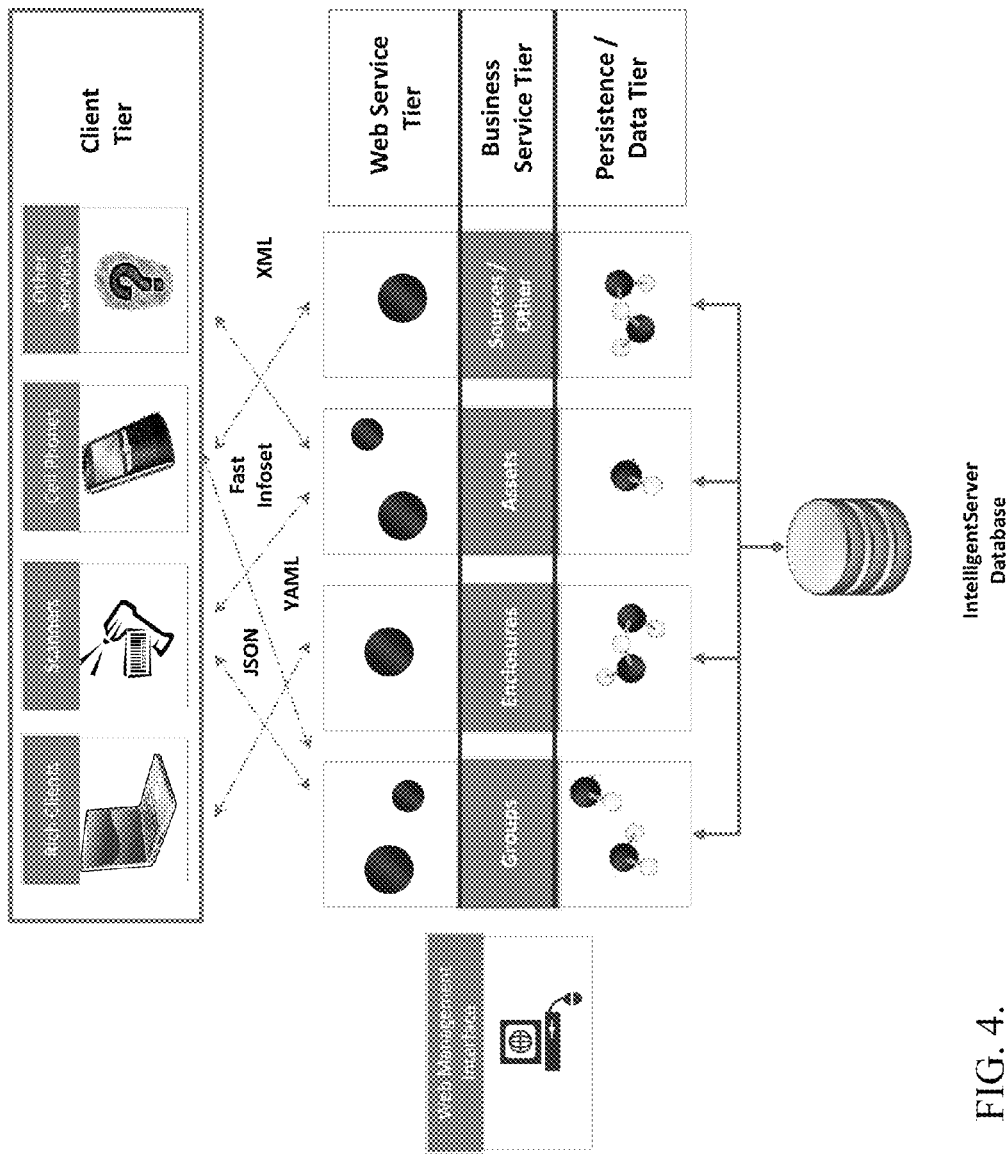
FIG. 4 is a schematic view of the underlying four tier architecture of the system for capturing and managing assets in disparate locations and how that information is stored, managed and communicated according to an embodiment of the invention.

FIG. 4 is a schematic view of the underlying 4 Tier Omnibus Architecture developed as the underlying technology used for the system according to an embodiment of the invention.

A Persistence/Data Tier provides an abstraction layer with respect to how the data is stored. It deals with storage and retrieval of the data in a storage neutral manner. In the current embodiment, JPA 2.0, a part of the Java EE 6 framework, is utilized to manage storage and retrieval of data from various databases in a vendor neutral manner.

A Business Service Tier contains the application software and services. This tier is designed to be independent of the persistence/data tier so that applications can be built independent of the data storage technology and vice versa. The business logic tier handles enforcing security, validation of data, and enforcement of constraints so as to ensure a consistent model of the system being managed. The current embodiment uses a variety of Java EE6 services and features to provide these features, including Java CDI, EJB 3.1 and JAAS.

A Web Service Tier provides access to a variety of clients potentially using a variety of technologies, such as REST, Java RMI, and others. The current embodiment of this invention uses the JAX-RS technology supplied by Java EE 6 to provide a REST interface to the underlying services and data. The REST architectural style is widely used on the World Wide Web. Its architecture characterizes and constrains the macro-interactions of the four components of the Web, namely origin servers, gateways, proxies and clients, without imposing limitations on the individual participants. In this way, it provides simplified access to its services to a wide variety of clients. As business needs change, the current embodiment can easily be extended to support other service styles as well, such as JAX-WS, and Java RMI.

A Client Tier represents external and internal customers interacting with the current embodiment of this invention through a variety of client devices and applications. In the current embodiment of this invention, this is done through its REST based web services interface, but as stated above, the web service tier can be expanded to support clients that utilize different protocol technologies such as RMI.

Figure 5:
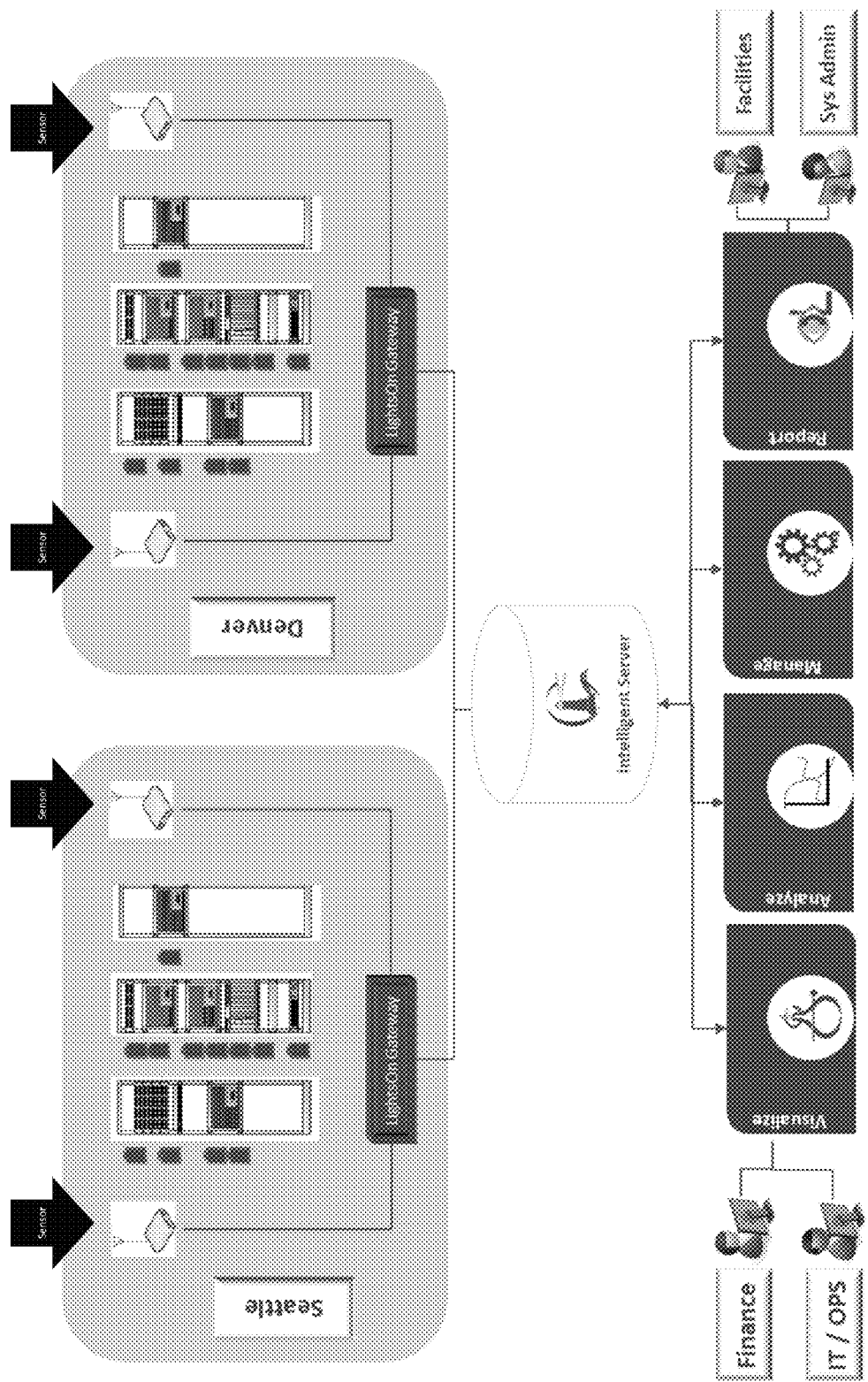
FIG. 5 shows a datacenter example of the topological schematic view of the system for capturing and managing inventoried and tagged assets in disparate locations and how that information once in the database is accessed by user and allows specific requirements to be achieved according to an embodiment of the invention.

FIG. 5 shows a datacenter example of the topological schematic view of the system for capturing and managing assets in disparate locations and how that information is translated into specific user requirements according to an embodiment of the invention. When "Active" RFID technology is deployed, sensor concentrators are deployed and run onsite at a customer location. The Sensor Concentrators capture asset information in real-time or near real-time information from RFID readers which in turn checks the heartbeat. The heartbeat includes a timer that fires, sending heartbeat messages and tag observations including asset temperature updates, reader updates showing motion when a tag moves from one reader to another, activator updates when motion forces the activation of a tag, usually when it moves through an activation field at a door. The Sensor Concentrators send all captured data through the gateway and across secure network, intranet or internet connections to the backend database. Once in the database users can observe what is happening at each location for each asset and manage their needs appropriately.

Defining Services for Asset Management and a Single Interface for Managing, Analyzing, Visualizing and Reporting An embodiment of the invention provides a toolset for managing, analyzing, visualizing and reporting on assets in multiple, disparate locations in a single GUI user interface. Below are two illustrative examples of the systems use, firstly in a datacenter and secondly on a farm.

Datacenter Example: To populate the system (FIG. 5), the assets are tagged with passive or active RFID tags. These tags are matched with the serial number of the asset to provide the database location; physical building location, room, rack and uPosition, asset information; manufacturer, model, configuration, power rating and other identification information. This information is gathered automatically through sensors and readers, passes through proprietary LightsOn API's and interfaces and then loads into the database. A user may also add assets manually to the database. Once the data capture has been complete the user can choose the manage, analyze, report or visualize options depending on the specific need. The locations can be selected and then asset information uniquely selected allowing any stakeholder, irrespective of their need to get the precise information they desire. This interface focuses on displaying not just the assets themselves, but also their key details and metrics. Once created, the "new datacenter" may be selected by picking it off the drop down bar in the menu window.

The Manage Capability

Figure 6:
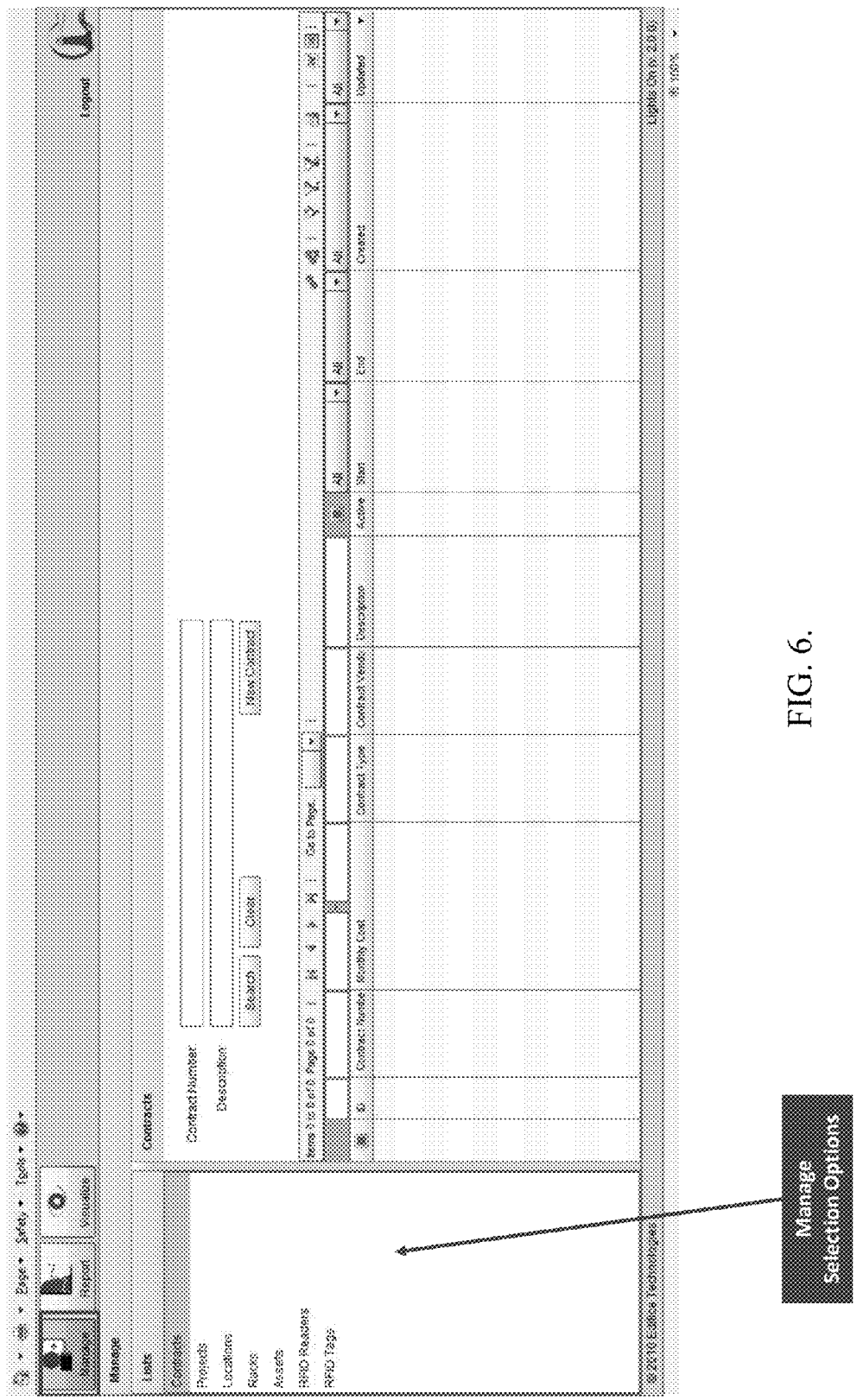
FIGS. 6 through 17 show illustrative embodiments.
Figures 1, 7:
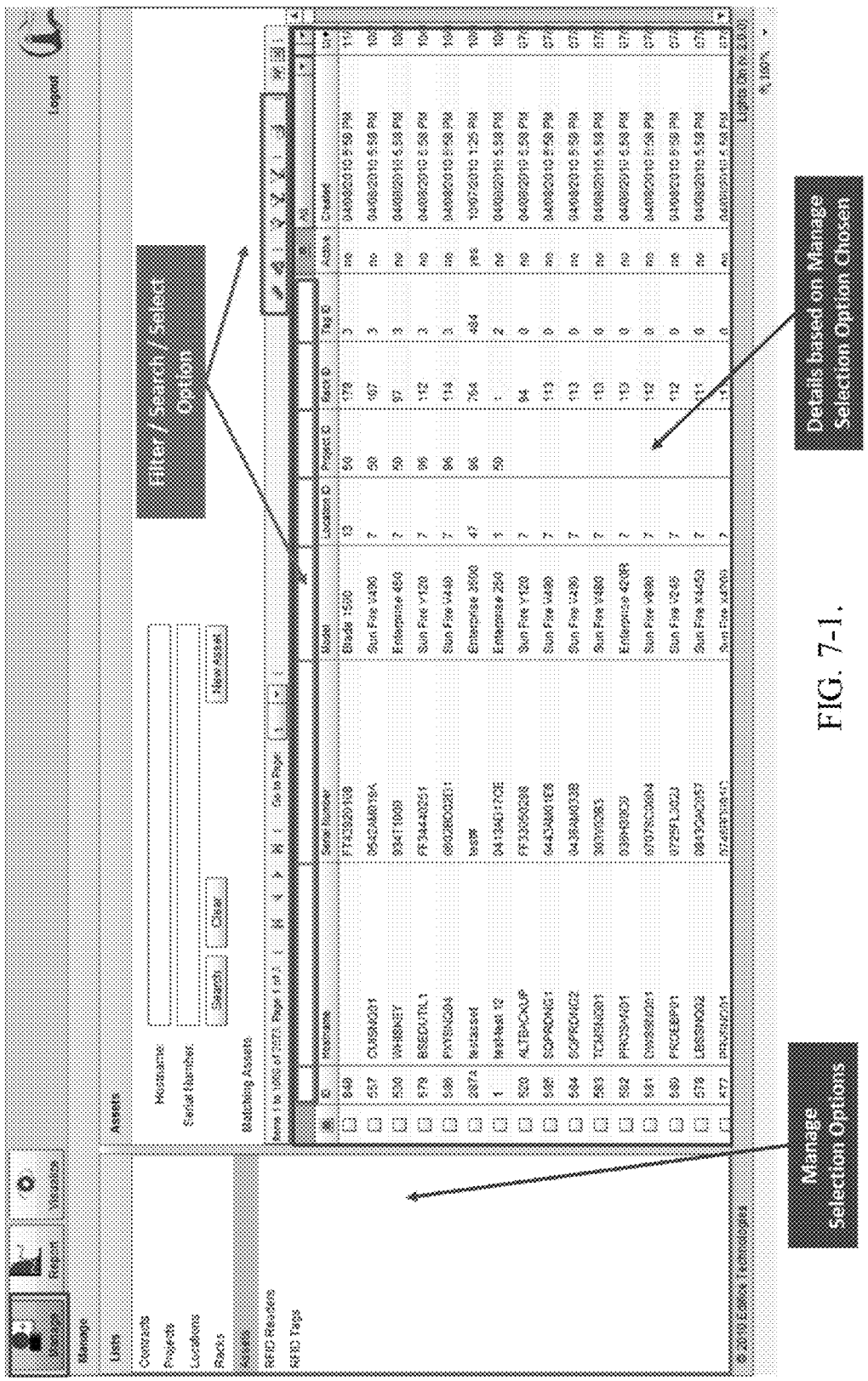
Figures 2, 7:
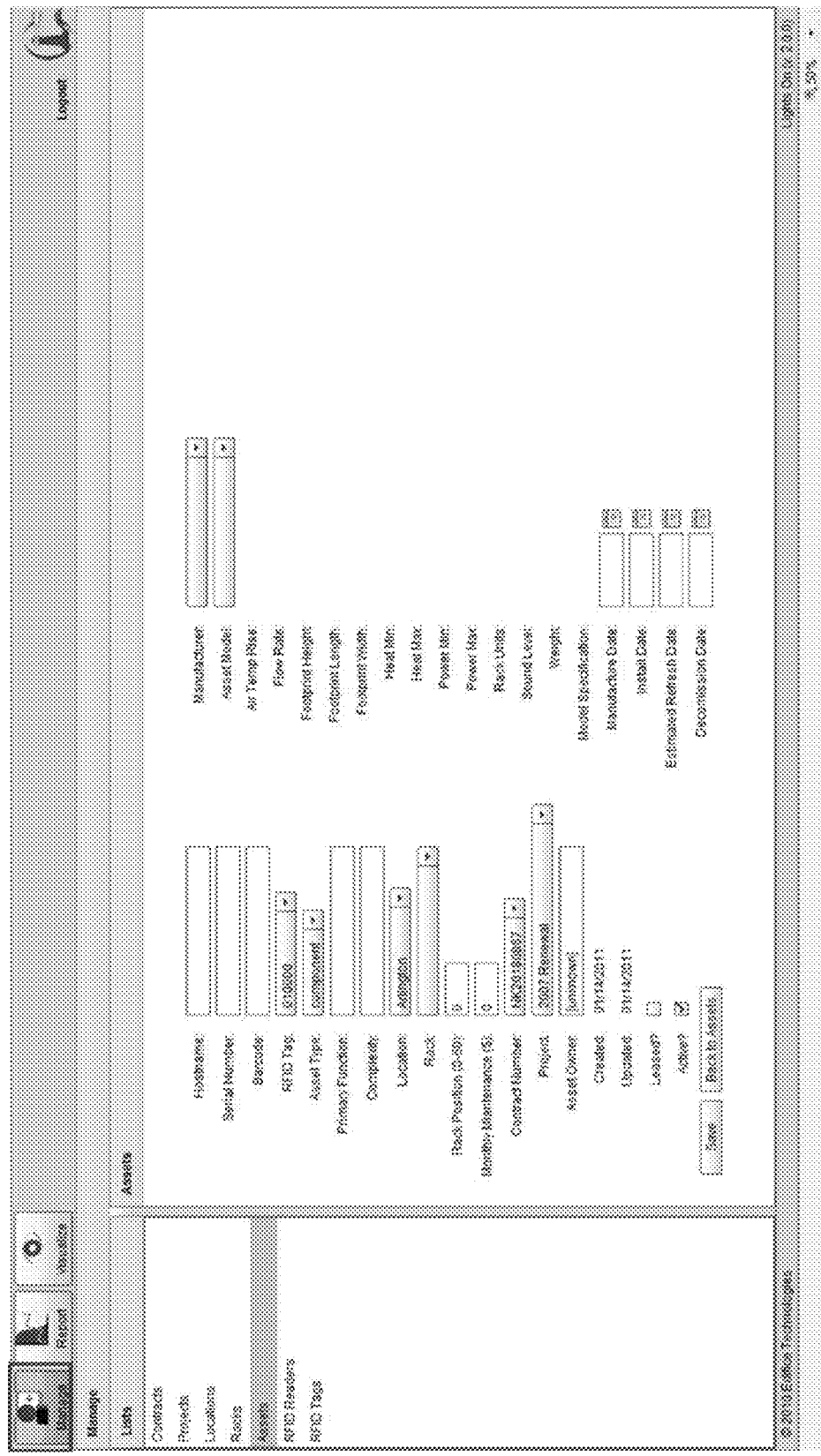

A Manage UI allows a user to see assets captured electronically and create and populate existing or new locations for assets manually. Manage then allows a user to view, analyze, add, change or delete assets. FIG. 6 shows the initial Manage template with a list of typical types of data being captured. Within Manage a user can see in detail the status of assets, which projects they are assigned to, their physical location, the contracts they were procured under, which RFID readers are tracking the asset and the RFID tags associated with the assets. A user can also manage and manipulate the racks in which assets are stored. FIG. 7-1 shows the Manage UI according to an embodiment of the invention.

Figure 12:
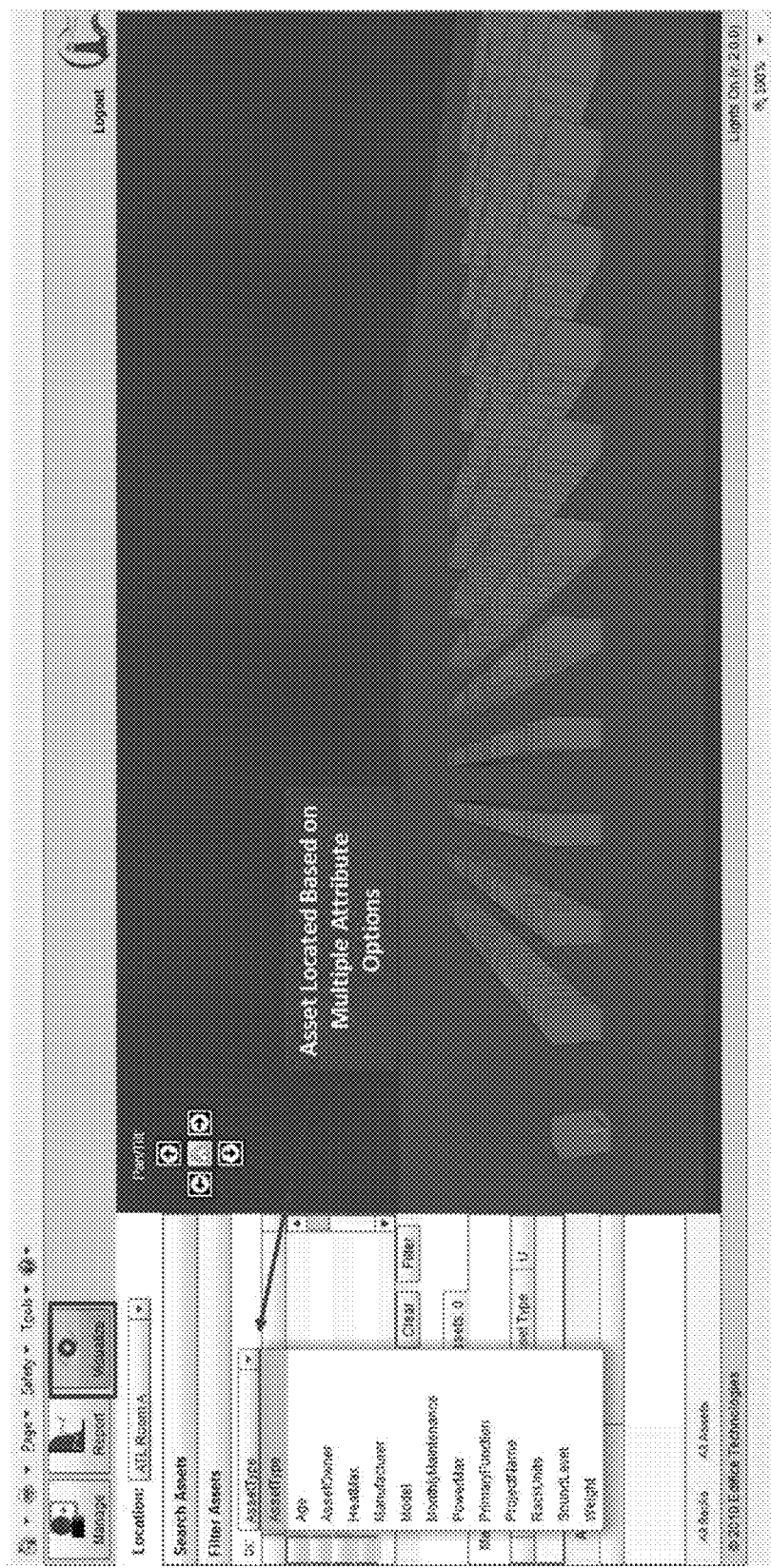
Figures 1, 12:
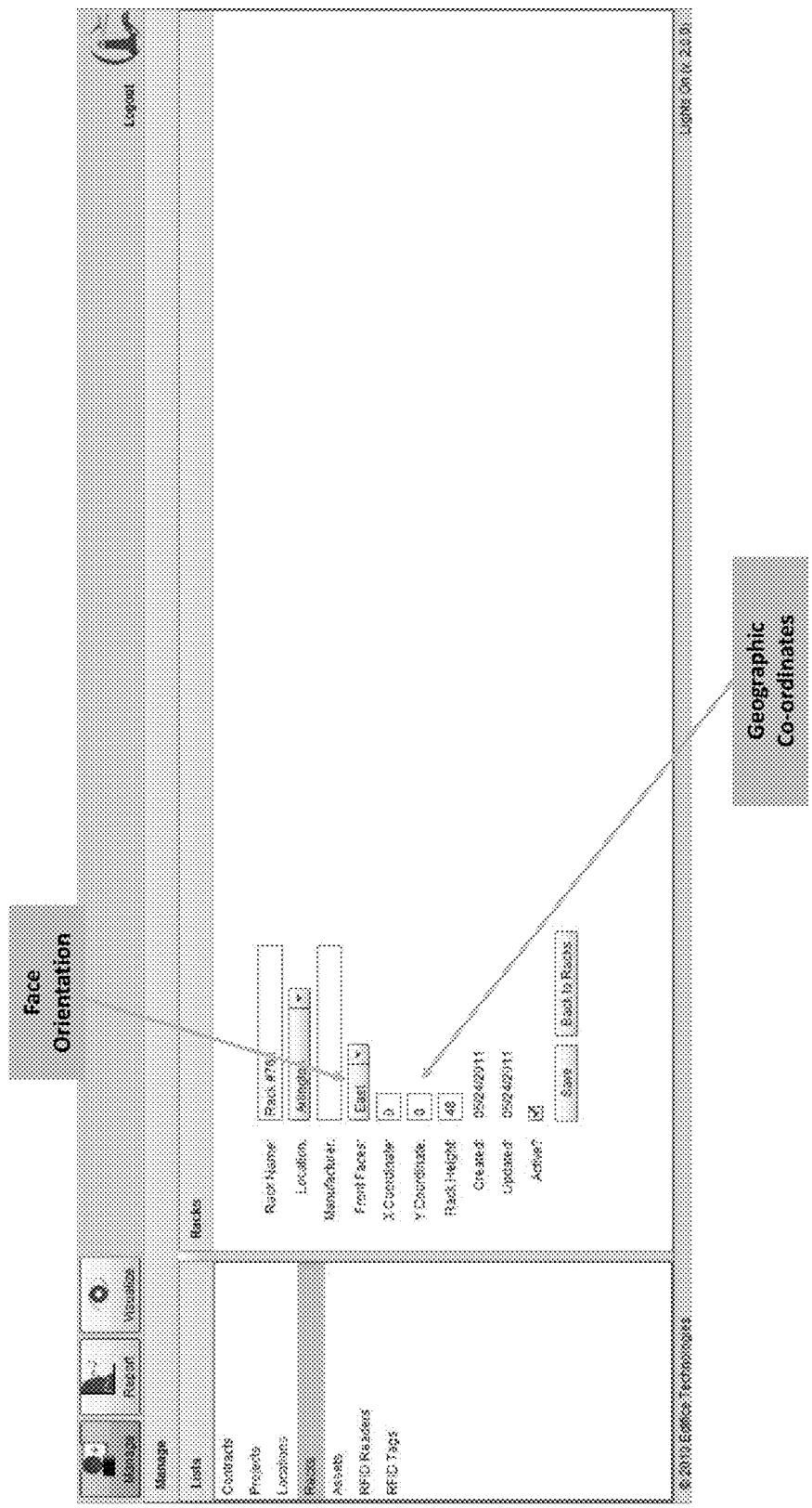
Figures 2, 12:
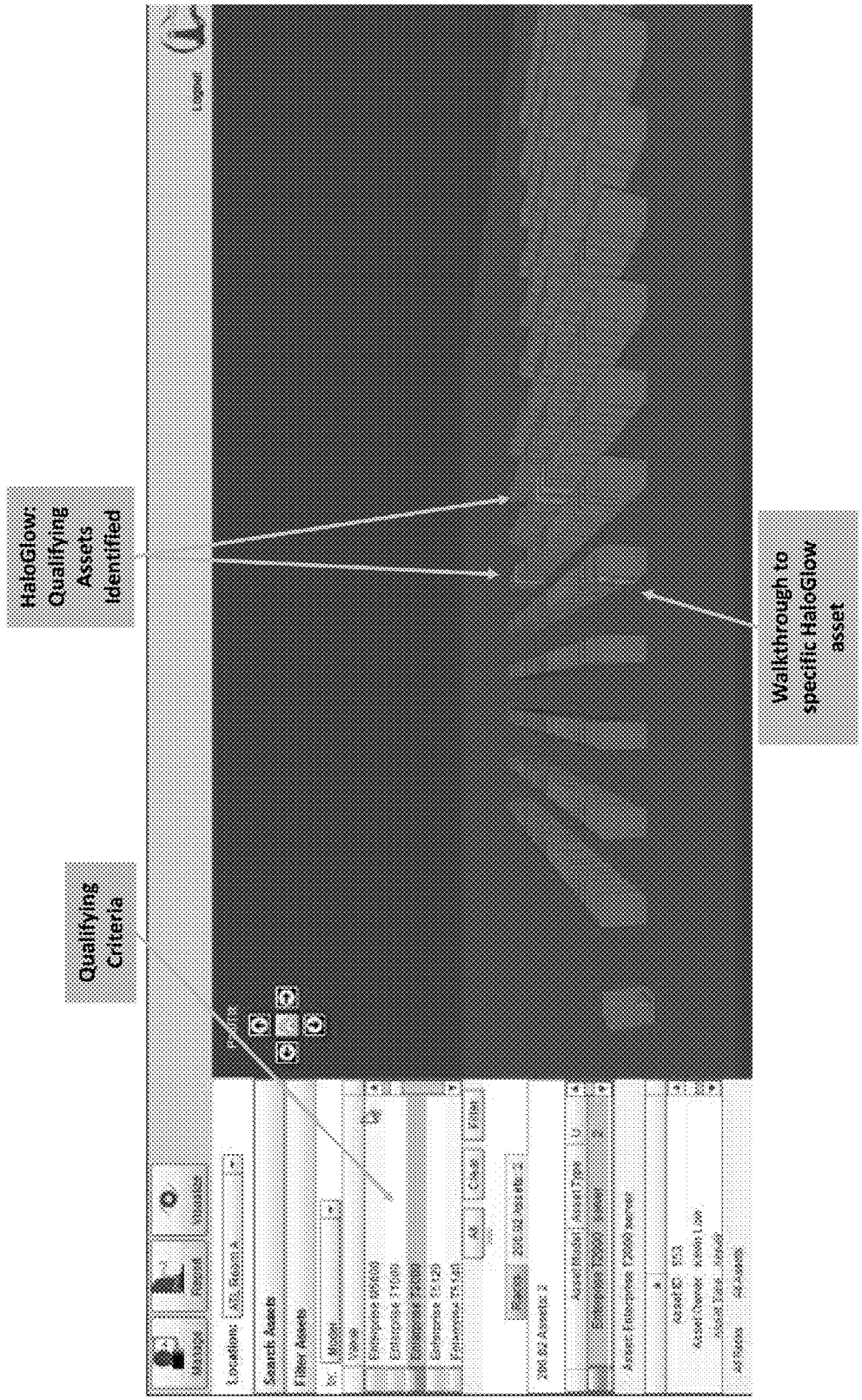
Figures 3, 12:
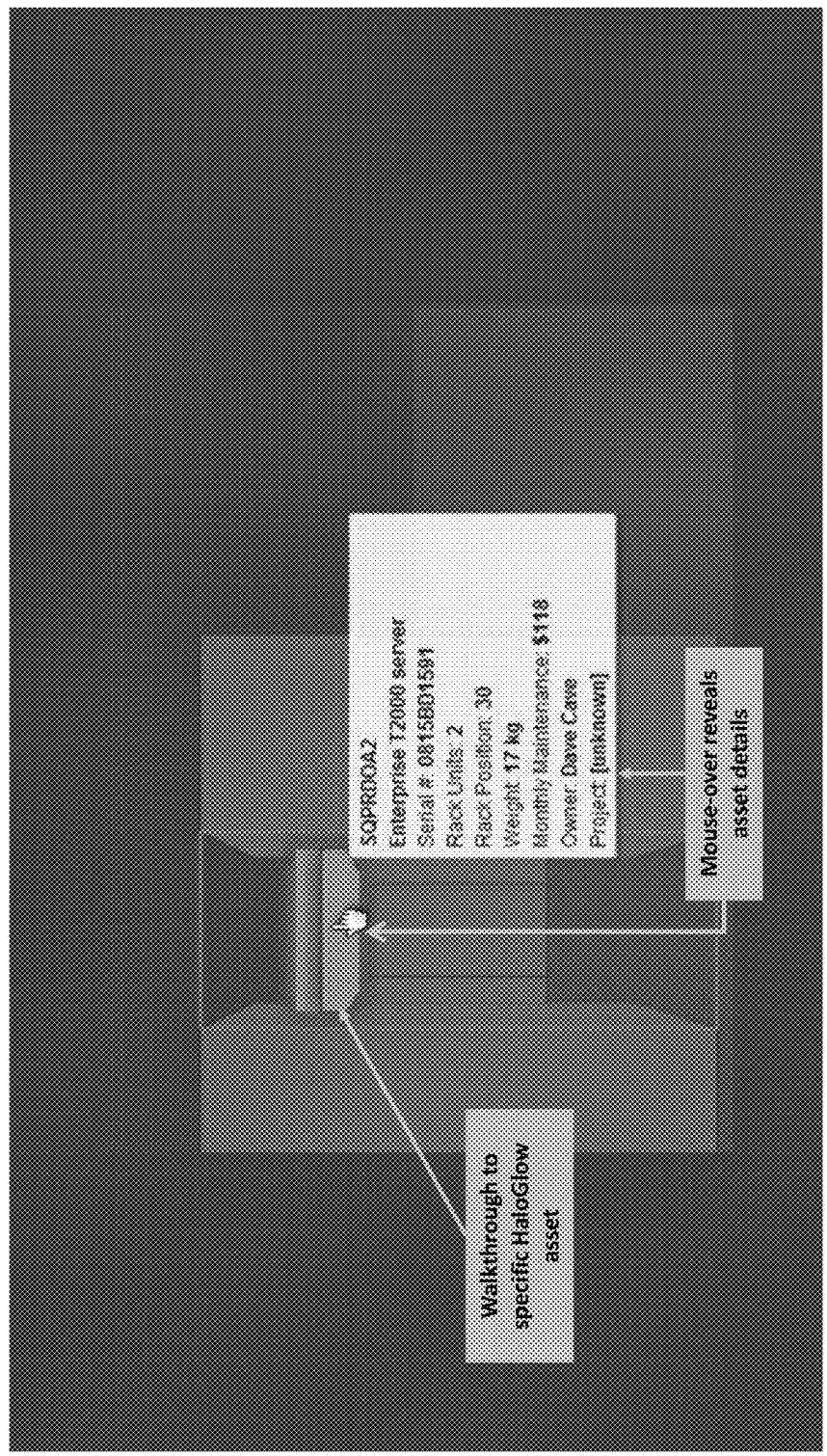
Figure 16:
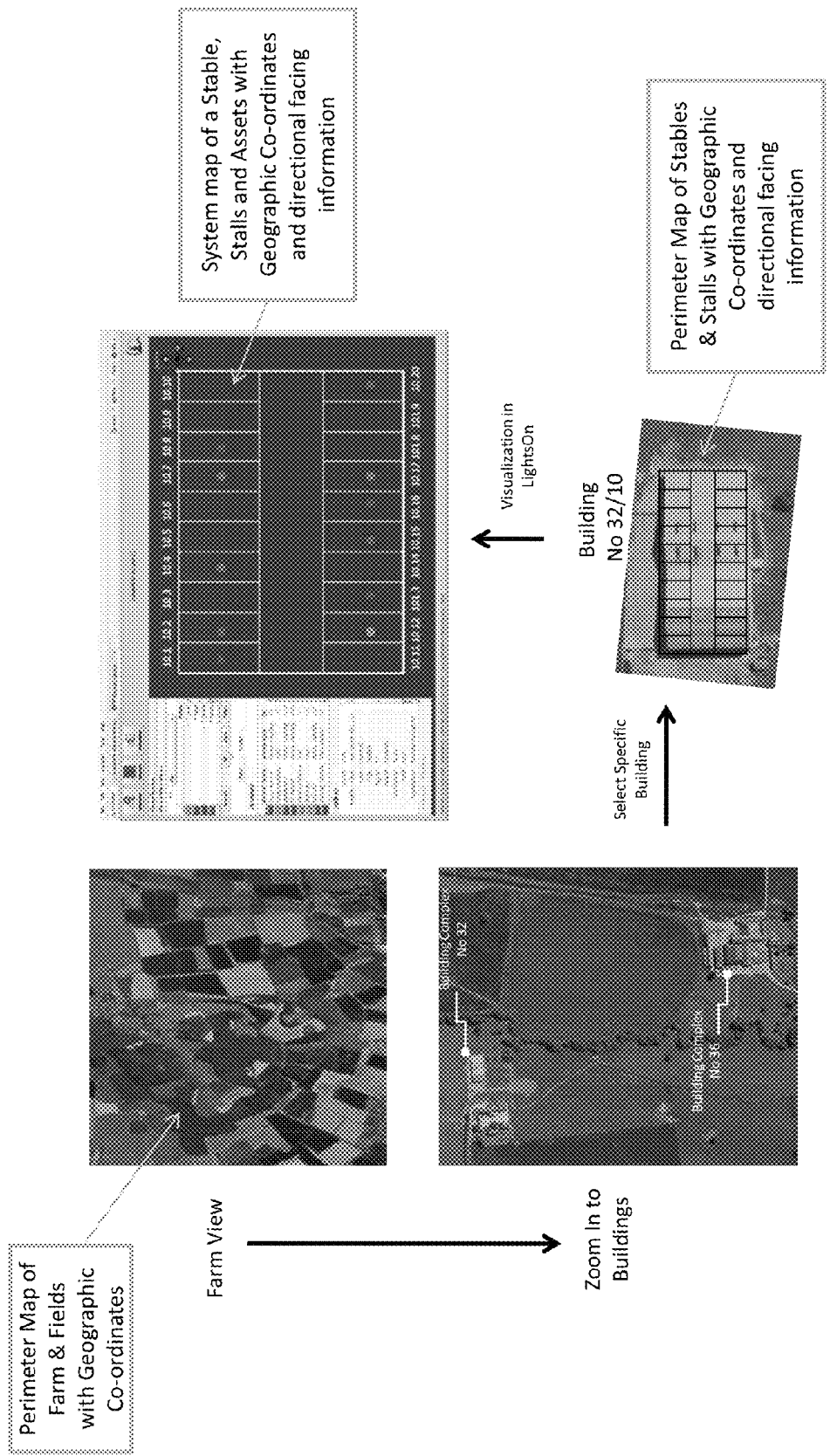

Due to the 3 dimensional nature of assets and enclosures and their physical/geospatial attributes the system captures the location and orientation of each asset so that it can be identified and tracked on any movement. For example, FIG. 12-1 shows the Manage Capability for datacenter racks highlighting the orientation attributes captured for this type of enclosure including "X" and "Y" co-ordinates and the direction the front of the asset is facing. As another example, FIG. 16 highlights the orientation and geospatial data being captured in a farming scenario.

The Manage UI allows a user to filter, search and drill down on a specific asset to see the details of each asset that match the criteria selected. One can see information concerning the assets composition, tagging references, environmental factors, key dates, financial and contract information.

Specific Asset Drill Down

FIG. 7-2 illustrates a detail asset information or data entry screen.

The Report Capability

Figure 8:
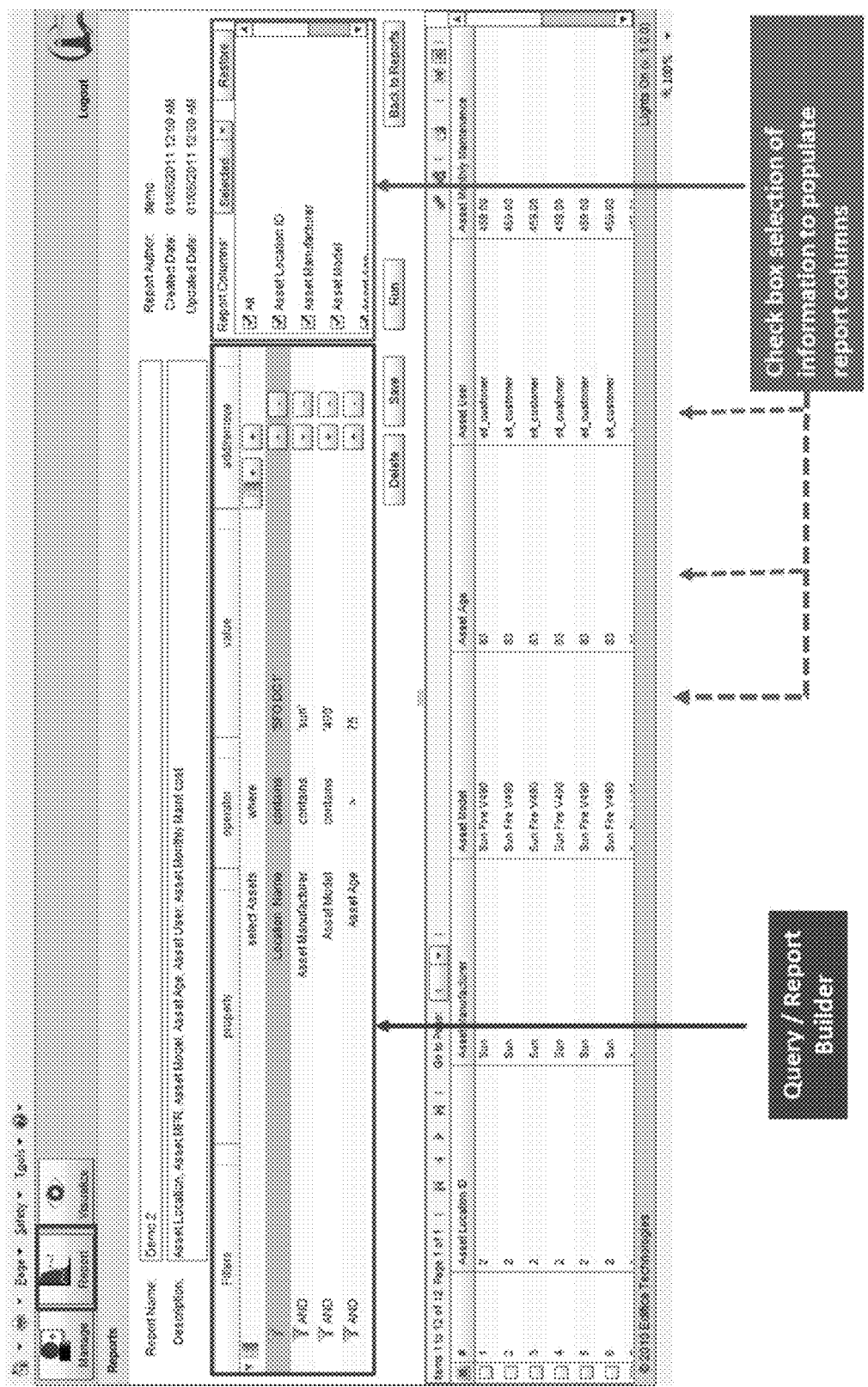

FIG. 8 shows the Report user interface according to an embodiment of the invention. A Report UI allows a user to select from any of the dimensions, properties or measures needed for any enquiry. The selectable properties and measures available appear in the user defined query and report builder section of the UI and user can apply conditional filters to these attributes as needed. User can further determine the layout of the report choosing which columns of information it will contain. Any multiple of these can be selected by a user.

Building Queries Using the GUI Report Builder

Figure 9:
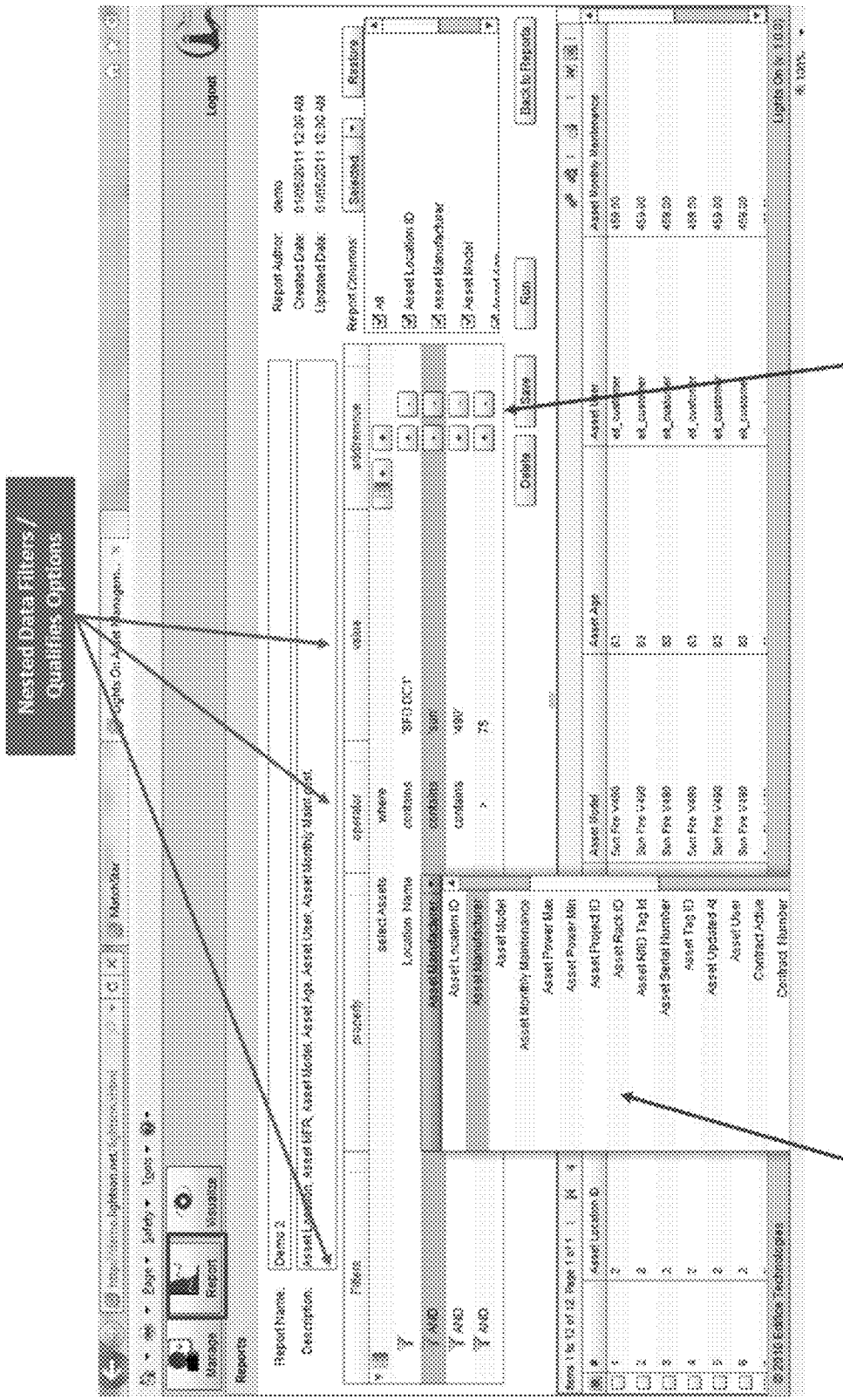

The Report UI allows the build out of uniquely required views of information by creating a user defined query that allows the selection of multiple properties to which can be applied selected filters, operators and values to further hone and qualify. These criteria can be added to build a "nested query" capability. This allows any authorized user, irrespective of their need to get the precise information they need. FIG. 9 shows a nested query example and the use of selectable drop down options that are available for each property, filter or operator specific to a single asset property or multiple data requirements to gain a specific user defined view. A user can select any of these attributes to report on by mousing over the property, clicking on it and picking the specific one needed. This process can be repeated with other properties and the user can decide where to position information by grabbing columns in the reported results at the bottom of the screen. Through this process a user builds custom reports, precisely containing the information they need and in the order and format they require.

Printing Reports and Exporting Queries

Figure 10:
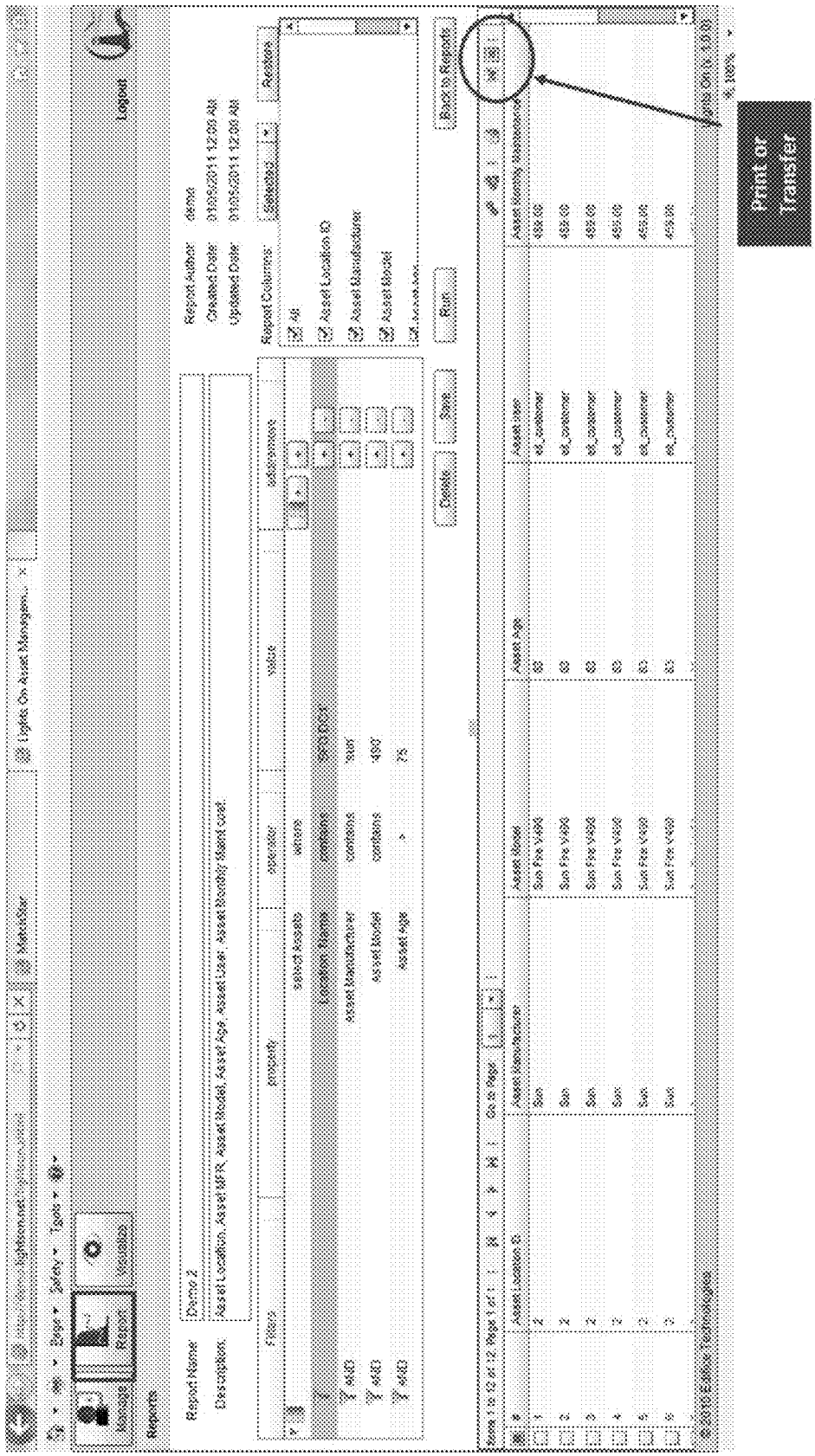

The Report UI allows a user, once the required view of information is reached, to save the query, print normally, create pivot tables, print as an Adobe .pdf format or download the specific information to Microsoft Excel. FIG. 10 shows Export Icons within Report.

GUI Tools to Select a Locate Criteria

Figure 11:
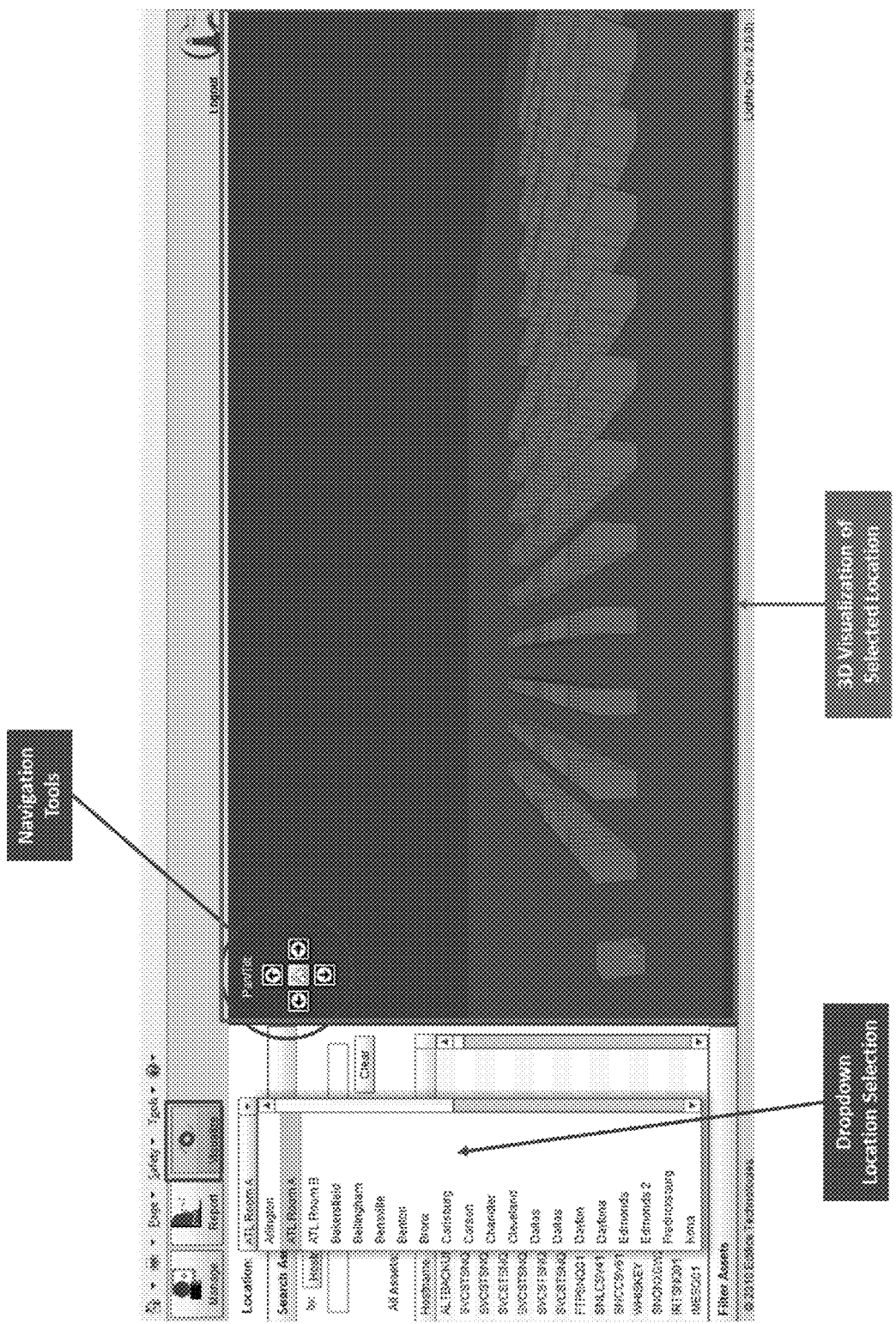

A Visualize UI provides a three dimensional visualization of each location. One can select the location from those available in a drop down box and then use mouse controls tools to zoom in or out and pan/tilt tools. FIG. 11 shows location selection and navigation tools in the Visualize UI.

Users can filter their selection based on any information including asset type, manufacturer, age, owner, project etc. FIG. 12 shows Drop down filtering criteria.

In order to orientate and geospatially align assets within their enclosures, the system captures and employs physical location information. FIG. 12-1 is an illustrative example of the orientation and geospatial data captured for a rack enclosure within a datacenter including "X" "Y" co-ordinates and the direction in which the rack is facing. This data is used to virtually map the data center within the Visualize UI.

The Visualize UI provides a consistent drop-down capability to allow users to select the criteria for the assets they are looking for. FIG. 12-2 shows the HaloGlow effect based on the selection of a single filter attribute. Within this simple datacenter example, all racks containing assets with that filter criteria are highlighted with a HaloGlow. Those that have no matching assets are not highlighted enabling the differentiation between the two.

Once assets have been highlighted with HaloGlow, users can navigate through the datacenter to a specific asset using the 3D Walkthrough capability. FIG. 12-3 shows an example of Walkthrough zooming in to a specific asset and then accessing its more detailed attributes by a simple mouse over.

Three Dimensional Visualization

Figure 13:
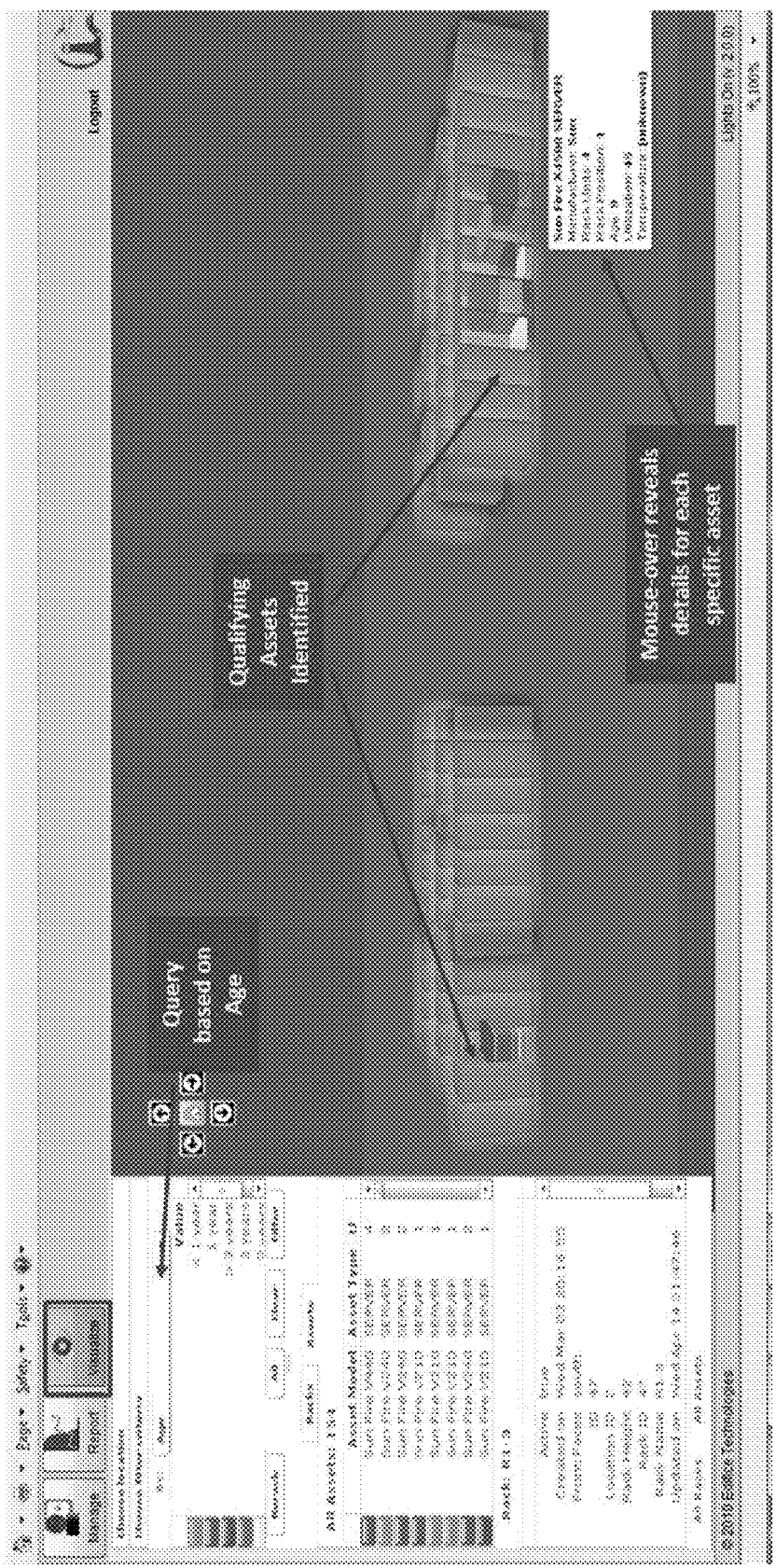

Once the filter criteria have been selected, the Visualize UI highlights where the assets that match those criteria are precisely located. By moving the cursor over each asset a "pop-up" box appears to give basic information on the asset in question. The filter criteria is automatically provided unique colors to enhance the user experience and see the varying conditions/ranges of that filter. FIG. 13 shows assets conforming to selection criteria.

Figure 14:
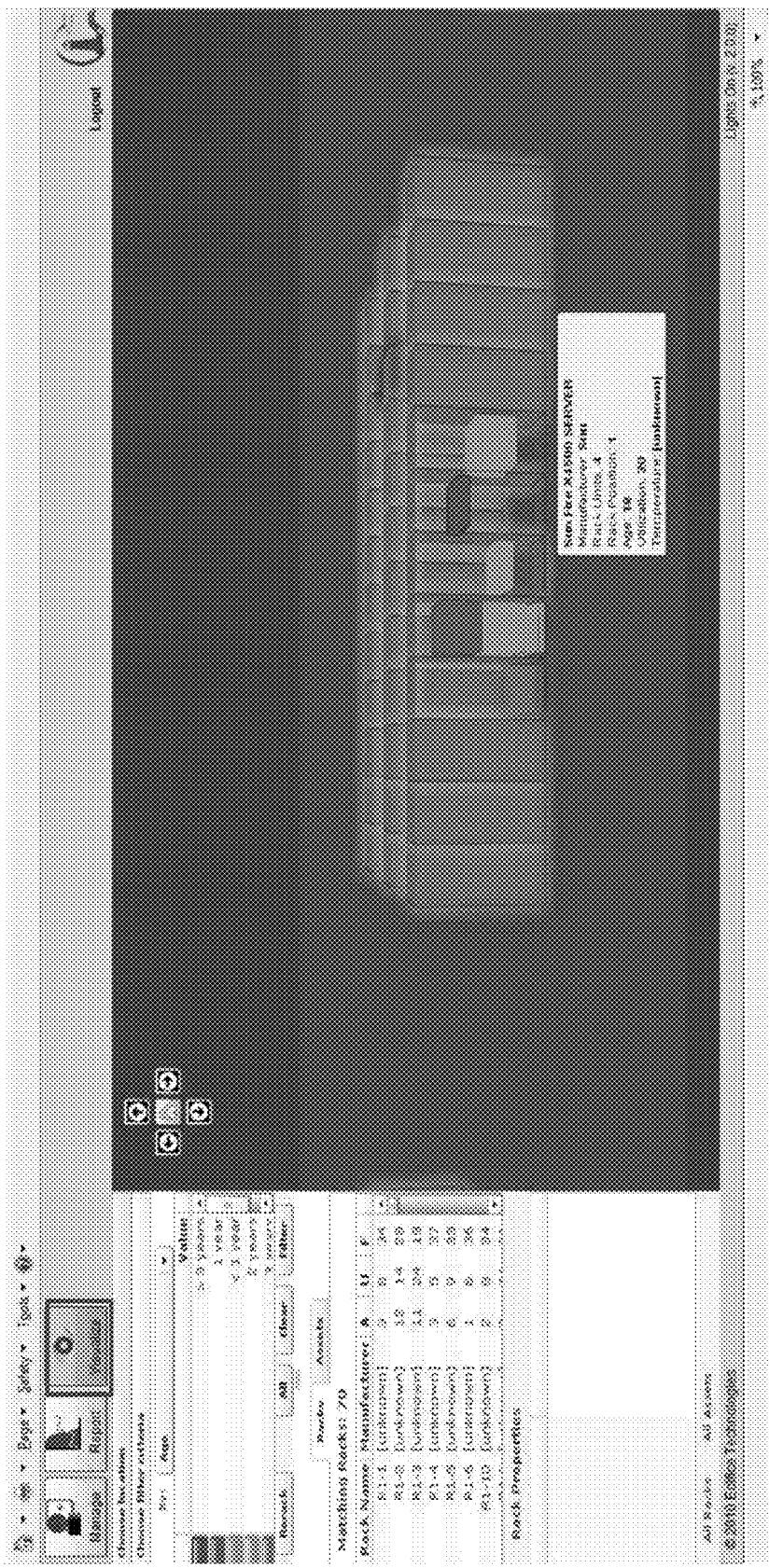

Having established the filtering criteria and being able to see the results for a whole datacenter, a user can then zoom in on any specific rack location or asset as they see fit or navigate around the datacenter as if one was literally walking the aisle to see what assets conform to the query. FIG. 14 shows the specific information concerning one specific asset by positioning the cursor over the asset in question.

Integration Between Manage, Report and Visualize

Figure 15:
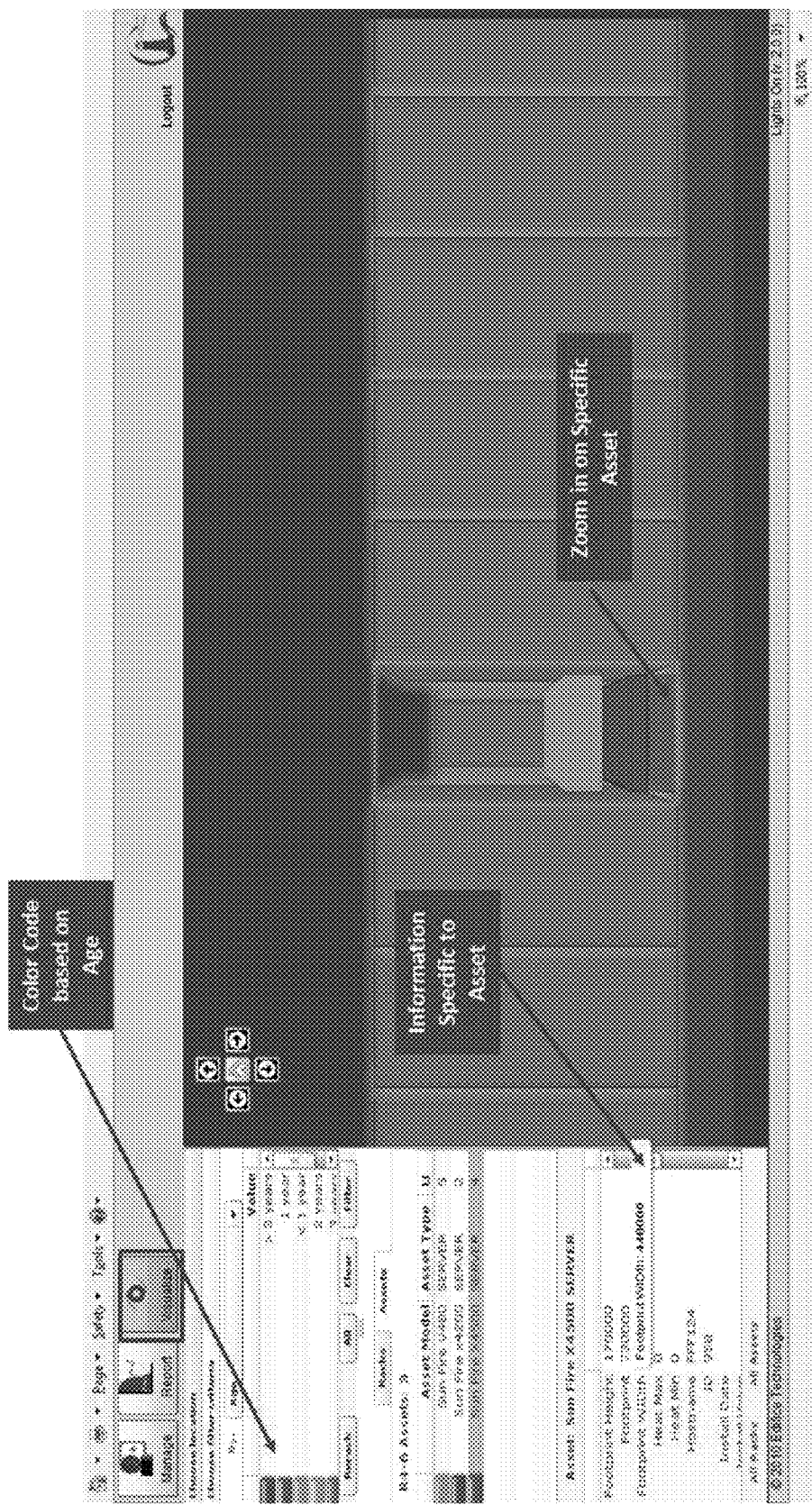

Due to the full integration of all the embodiments of this solution a user can now click on a specific asset and see all its specific information. FIG. 15 shows by clicking on the asset the system provides complete details and every attribute pertaining to the asset including physical attributes, financial information, age and ownership in a single fully integrated view.

Farm Example (FIG. 16) To populate the system in this example follows the exact same logic as that show in the datacenter example as does the use of the Manage Capability, Asset Filtering, Report Capability, User Defined Nested Report Builder, Printing Reports, Exporting Queries and GUI Tools. It further gives examples of the system Perimeter modeling capability that in this case would be used to map the extents of farms, fields, stable and stalls and the orientation and geospatial data captured.

From a visualize standpoint one can view the farm geospatially from the air selecting field or building locations. The zoom capability in this example allows closer scrutiny of certain building and the selection of one that is of interest. Once done the floor layout of the building is superimposed.

On entering the building the system allows comprehensive visualization in both 2D, 3D or both depending on which alternative best suits the application. In this example the image shows horses in stalls within the building.

As with the datacenter example one can monitor and manage information pertaining to the assets, in this case horses. Having established the filtering criteria and being able to see the results for a whole stable, a user can then zoom in on any specific stall or asset as they see fit or navigate around the stable as if one was literally walking the floor to see what assets conform to the query, in this case the horses' age.

Furthermore all the Report capabilities demonstrated in the earlier example would equally apply in this instance. As a result the system allows the selection from any of the dimensions or measures needed for any enquiry. A list of all the selectable dimensions and measures available appear in scrollable areas on the left hand side of the user interface. Any multiple of these can be selected by a user.

Figure 17:
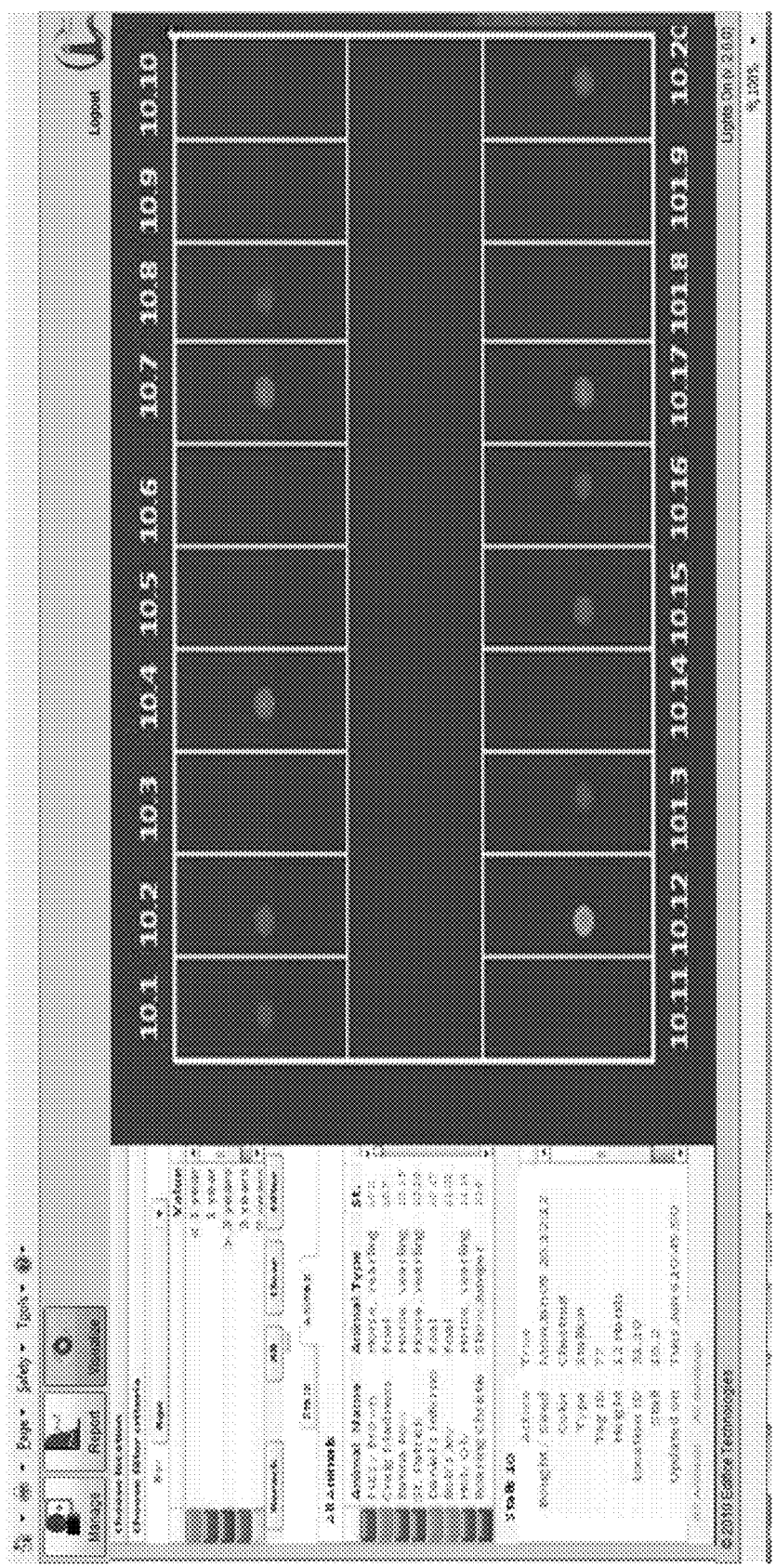

Finally due to the full integration of all the embodiments of this solution a user can now click on a specific horse and see all its specific information—see FIG. 17.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A system for semantically modeling relationships and dependencies between groups, enclosures, assets, and support entities according to an industry specific manner, the system comprising:

a user interface device comprising a user input device and a display device;

a relational database;

a processor in data communication with the database and the user interface device, the processor configured to:

receive relationship and dependency information between groups, enclosures, assets, and support entities for a corporation from the user interface device, wherein each enclosure represents an organizational unit that has physical presence, wherein each enclosure includes a semantic label, an extent, a position, and a physical orientation in space relative to a coordinate system, and wherein each enclosure is configured to have other enclosures or assets as children;

receive attributes with associated measurements for the groups, enclosures, assets, and support entities for the corporation from the user interface device, wherein the attributes with associated measurements are formatted according the specific industry of the corporation;

store the relationship and dependency information and the attributes with associated measurements into the relational database; and receive a specification of filter criteria for a user defined asset search;

automatically provide unique colors to each of multiple data ranges in the filter criteria; and generate a graphical user interface that provides a three dimensional (3D) visualization of the groups, enclosures, assets, and support entities, wherein at least some of the assets are colored according to the unique colors for each of the multiple data ranges in the filter criteria; and a plurality of data transmission devices, each of the plurality of data transmission devices configured to be associated with one of the groups, enclosures, assets, and support entities for the corporation, wherein the plurality of data transmission devices comprises data of the associated one of the groups, enclosures, assets, and support entities; and a plurality of data collection devices in signal communication with the processer and the plurality of data transmission devices, the plurality of data devices configured to retrieve data from the plurality of data transmission devices, wherein the data transmission devices and data collection devices comprise at least one of radio frequency identification (RFID) tags, antenna, readers or concentrators, wherein the processor enters the data received from the data collection devices into the relational database, wherein the processor is further configured to execute a plurality of data Application Program Interfaces (APIs), the executed APIs integrate data received from the data collection devices into a comprehensive view of the group, enclosures, assets, and support entities based on the relational database, and wherein the processor is further configured to allow a user to share asset information comprising all of a physical asset component data, financial data, contractual data and utilization data; and permit the management, display and analysis of asset information on a single user interface.

2. A system of claim 1, wherein the processor is further configured to allow a user to create at least one of a graphical or text based report regarding one or more of the groups, enclosures, assets, and support entities, wherein the report includes at least one of absolute values, ranges or comparative values of at least a portion of the attributes, wherein the report is at least one of a filtering, sorting, or ordering of the groups, enclosures, assets, and support entities.

3. The system of claim 1, wherein the processor is further configured to calculate return on investment based on the asset data, wherein the asset data comprises at least one of cost to replace or cost of ownership.

4. The system of claim 1, wherein the processor is further configured to allow a user to define one or more perimeters within which each of the assets are located and to identify the assets within the one or more perimeters.

5. The system of claim 1, wherein the relational database comprises a supplier database configured to store all assets in an individual group and across all groups.

6. The system of claim 1, further comprising a remote access device that is in data communication with the processor via a public or private data network, wherein the remote access device comprises at least one of a mobile device, a laptop computer, a tablet computer or a desktop computer.

7. The system of claim 1, wherein the processor is further configured to allow a user to:
modify records of the assets, enclosures, groups, and support entities;
display values of the attributes; and
edit the values of the attributes within the relational database.

8. The system of claim 5, wherein the processor is further configured to allow a user to semantically map the received attributes from disparate sources and the supplier database, wherein the semantically mapped attributes provide context to the received attributes and the attributes' relation to assets, enclosures and groups.

9. The system of claim 1, wherein the processor is further configured to allow a user to uniquely identify a location of an asset and physical orientation based on data received using at least one of a Radio Frequency Identification (RFID) system, a Real-time Locating System (RTLS) or Global Positioning System (GPS).

10. The system of claim 9, wherein the processor is further configured to allow a user to uniquely identify asset identifiers to associate, capture, monitor and timestamp, data with other data pertaining to the asset within the system.

11. The system of claim 3, wherein the processor is further configured to allow a user to perform at least one of a query, an interrogation, a forecast, a what if scenario and to perform modeling of return on investment based on any change to assets, enclosure and groups.

12. The system of claim 1, wherein the processor is further configured to receive attributes of assets from a supplier to the processor.

13. The system of claim 5, wherein the processor is further configured to provide trending information and analysis of the user's industry as compared to the user's specific asset deployments.

14. The system of claim 1, wherein the 3D visualization comprises annotation of groups with at least one of bounds, extents, photographs and related media elements, wherein the 3D visualization comprises at least one of a diagrammatic image or a figurative image.

15. The system of claim 1, wherein the user interface allows a user to perform at least one of browse, find, create, update or delete information associated with the assets, the enclosures, the groups, and the support entities, and the relationship information.

16. The system of claim 1, further comprising:
a remote access device configured to access the processor via a public or private data network.

17. The system of claim 1, wherein the processor is further configured to perform an audit of attributes.

18. The system of claim 1, wherein the processor is further configured to synchronize at least all the information for each asset and show via the graphical user interface changes to status of an asset.

19. The system of claim 18, wherein the processor is further configured to generate a unique identifier based on a user defined asset search, wherein when the unique identifier that is presented on the graphical user interface, the unique identifier provides a visual indication of the presence and location of all assets that match the user defined asset search.

20. The system of claim 18, wherein the processor is further configured to allow a virtual walkthrough of the 3D visualization as presented on the display device based on user entered commands from the user input device.

21. The system of claim 20, wherein the processor is further configured to display asset attributes based on a user entered selection signal from the user input device during the virtual walkthrough.

* * * * *